（12） United States Patent
Miller et al.

(10) Patent No.: US 8,959,203 B1
(45) Date of Patent: Feb. 17, 2015

(54) DYNAMIC BANDWIDTH MANAGEMENT USING ROUTING SIGNALS IN NETWORKS WITH DIRECT PEERINGS

(75) Inventors: Kevin Christopher Miller, Herndon, VA (US); Jeremy T. Hall, Sterling, VA (US); Andrew J. Doane, Vienna, VA (US); Michael B. Furr, Washington, DC (US)

(73) Assignee: Amazon Technologies, Inc., Reno, NV (US)

( * ) Notice: Subject to any disclaimer, the term of this patent is extended or adjusted under 35 U.S.C. 154(b) by 383 days.

(21) Appl. No.: 13/330,438

(22) Filed: Dec. 19, 2011

(51) Int. Cl.
*G06F 15/173* (2006.01)

(52) U.S. Cl.
USPC ............ 709/224; 709/223; 709/225; 709/226

(58) Field of Classification Search
CPC ... H04L 45/125; H04L 145/302; H04L 45/70; H04L 47/29; H04L 12/1432; H04L 12/1414; H04L 12/1417
USPC .................................. 709/223, 224, 225, 226
See application file for complete search history.

(56) References Cited

U.S. PATENT DOCUMENTS

| | | | |
|---|---|---|---|
| 5,748,629 A | 5/1998 | Caldara et al. | |
| 5,959,677 A * | 9/1999 | Date et al. ................. | 375/240.01 |
| 6,639,919 B2 | 10/2003 | Kroninger et al. | |
| 7,107,312 B2 | 9/2006 | Hackbarth et al. | |
| 7,292,577 B1 | 11/2007 | Ginipalli et al. | |
| 7,327,682 B2 | 2/2008 | Gandhi et al. | |
| 7,359,322 B2 | 4/2008 | Khurana et al. | |
| 7,577,154 B1 | 8/2009 | Yung et al. | |
| 7,734,516 B2 | 6/2010 | Barnum et al. | |
| 7,743,001 B1 | 6/2010 | Vermeulen et al. | |
| 7,933,230 B2 | 4/2011 | Sato | |
| 7,970,903 B2 | 6/2011 | Oeda | |
| 8,626,113 B2 * | 1/2014 | Banjo .......................... | 455/405 |
| 2001/0022837 A1 | 9/2001 | Vasell et al. | |
| 2002/0118733 A1 * | 8/2002 | Frenkel ........................ | 375/219 |
| 2003/0074443 A1 | 4/2003 | Melaku et al. | |
| 2003/0236745 A1 | 12/2003 | Hartsell et al. | |

(Continued)

OTHER PUBLICATIONS

U.S. Appl. No. 13/555,360, filed Jul. 23, 2012; "Automated Multi-Party Cloud Connectivity Provisioning"; Cullen, et al.

(Continued)

*Primary Examiner* — Tammy Nguyen
*Assistant Examiner* — Jonathan Bui
(74) *Attorney, Agent, or Firm* — Robert C. Kowert; Meyertons, Hood, Kivlin, Kowert & Goetzel, P.C.

(57) ABSTRACT

Methods and apparatus for dynamic bandwidth management using routing signals in a network implementing direct peerings. A system includes a resource collection, an endpoint device connected to a private link of a network path to a client network, and a bandwidth manager. The bandwidth manager receives configuration settings of the client, comprising a baseline transmission rate of traffic. The bandwidth manager determines whether a difference between a measured transmission rate of traffic over one or more network paths linking the resource collection and the client network, and a peak transmission capacity of the one or more network paths, exceeds a threshold value. In response to a determination that the difference exceeds the threshold value, the bandwidth manager initiates a transmission of a routing signal to the client network indicative of an available transmission rate that differs from the baseline transmission rate.

22 Claims, 18 Drawing Sheets

(56) References Cited

U.S. PATENT DOCUMENTS

| | | | |
|---|---|---|---|
| 2004/0022194 A1* | 2/2004 | Ricciulli | 370/238 |
| 2007/0067424 A1 | 3/2007 | Raciborski et al. | |
| 2007/0135109 A1 | 6/2007 | Walter et al. | |
| 2007/0136195 A1* | 6/2007 | Banjo | 705/43 |
| 2008/0276085 A1 | 11/2008 | Davidson et al. | |
| 2008/0298374 A1 | 12/2008 | Rhoades et al. | |
| 2009/0070235 A1 | 3/2009 | Mehta et al. | |
| 2009/0112735 A1 | 4/2009 | Viehmann et al. | |
| 2009/0192945 A1 | 7/2009 | Perpina et al. | |
| 2009/0216889 A1 | 8/2009 | Hadi | |
| 2009/0276771 A1 | 11/2009 | Nickolov et al. | |
| 2009/0300635 A1 | 12/2009 | Ferris | |
| 2010/0027552 A1 | 2/2010 | Hill | |
| 2010/0039959 A1 | 2/2010 | Gilmartin | |
| 2010/0111093 A1 | 5/2010 | Satterlee et al. | |
| 2010/0125664 A1 | 5/2010 | Hadar et al. | |
| 2010/0131649 A1 | 5/2010 | Ferris | |
| 2010/0131948 A1 | 5/2010 | Ferris | |
| 2010/0165846 A1* | 7/2010 | Yamaguchi et al. | 370/236 |
| 2010/0195540 A1 | 8/2010 | Kerr et al. | |
| 2010/0226254 A1 | 9/2010 | Kerr et al. | |
| 2010/0226280 A1 | 9/2010 | Burns et al. | |
| 2010/0280934 A1 | 11/2010 | Kerr et al. | |
| 2010/0319004 A1 | 12/2010 | Hudson et al. | |
| 2010/0332262 A1 | 12/2010 | Horvitz et al. | |
| 2011/0016028 A1 | 1/2011 | Toure et al. | |
| 2011/0066752 A1 | 3/2011 | Lippincott et al. | |
| 2011/0131335 A1 | 6/2011 | Spaltro et al. | |
| 2011/0131647 A1 | 6/2011 | Sanders et al. | |
| 2011/0154212 A1 | 6/2011 | Gharpure et al. | |
| 2011/0179162 A1 | 7/2011 | Mayo et al. | |
| 2011/0202405 A1* | 8/2011 | Clark et al. | 705/14.49 |
| 2011/0231899 A1 | 9/2011 | Pulier et al. | |
| 2011/0286336 A1* | 11/2011 | Vasseur et al. | 370/238 |
| 2012/0130873 A1 | 5/2012 | Morgan | |
| 2012/0320764 A1* | 12/2012 | Callender | 370/252 |
| 2013/0156093 A1 | 6/2013 | Vonog et al. | |

OTHER PUBLICATIONS

Rekhter, et al.; "A Border Gateway Protocol 4 (BGP-4)"; Standards Track; The Internet Engineering Task Force (IETF); Jan. 2006; Copyright (C) The Internet Society (2006); 105 pages; retrieved from Internet: http://tools.ietf.org/pdf/rfc4271.pdf.

U.S. Appl. No. 13/306,775, filed Nov. 29, 2011; "Interfaces to Manage Direct Network Peerings"; Miller, et al.; 76 pages.

U.S. Appl. No. 13/330,449, filed Dec. 19, 2011; "Differential Bandwidth Metering for Networks With Direct Peerings"; Furr, et al.; 76 pages.

U.S. Appl. No. 13/306,801, filed Nov. 29, 2011; "Interfaces to Manage Last-Mile Connectivity for Direct Network Peerings"; Miller, et al.; 76 pages.

U.S. Appl. No. 13/335,465, filed Dec. 22, 2011; "Interfaces to Manage Inter-Region Connectivity for Direct Network Peerings"; Doane, et al.; 118 pages.

U.S. Appl. No. 13/335,490, filed Dec. 22, 2011; "Interfaces to Manage Service Marketplaces Accessible Via Direct Network Peerings"; Miller, et al.; 118 pages.

Network Visualization—Network Admission Control Deployment Guide (2007).Cisco Systems, Inc. pp. 1-14.

* cited by examiner

Service metering record 601:

| Metering start timestamp 602 | Metering end timestamp 604 | Client Account ID 606 | Service Instance ID 608 | Service Interface ID 610 | Incoming Traffic Measurement 612 | Outgoing Traffic Measurement 614 |

*Figure 6a*

Link metering record 651:

| Metering start timestamp 652 | Metering end timestamp 654 | Router ID 656 | Physical Port Number 658 | Client Account ID 660 | Incoming Traffic Measurement 662 | Outgoing Traffic Measurement 664 | Logical Connection ID 668 |

*Figure 6b*

DYNAMIC BANDWIDTH MANAGEMENT USING ROUTING SIGNALS IN NETWORKS WITH DIRECT PEERINGS

BACKGROUND

Many companies and other organizations operate computer networks that interconnect numerous computing systems to support their operations and the services they provide to their end customers distributed worldwide. For example, data centers housing significant numbers of interconnected computing systems have become commonplace, such as private data centers that are operated by and on behalf of a single organization, and public data centers that are operated by entities as businesses to provide computing resources to customers. In many cases providers set up large networks that may logically span several regions or even countries, and may include numerous data centers with varying levels of services and facilities available, utilized together to provide a unified set of services to their end customers.

In some data centers that have been set up to provide computing and/or storage facilities to remote clients, the set of computational resources at the data center may be dynamically divided into resource pools, with each pool being made available for exclusive use by a given client for designated periods of time. Customers may be billed for the various resources used for each service they access—e.g., for CPU usage based on the type of server used, for memory based on the amount of memory used at each server, and so on. There are a number of alternatives available for how the consumers of these facilities establish network connectivity to the resource pools that have been designated for their use. The customer requests may originate from a wide variety of devices—desktop personal computers, laptops, client-office servers, tablets, smart phones and the like. These devices may use either long-lasting network links (e.g., using a client office network with a T1 connection) to communicate with their proximate private network and/or the public Internet, or they may have transient connectivity (e.g., in the case where the customer uses a mobile smart phone). The proximate networks to which the customer devices are directly connected may in turn route request traffic to the provider network's data centers over a wide variety of paths. Such paths in many cases may have somewhat unpredictable performance, reliability and security characteristics.

For some casual types of service requests, such as a request from a customer to read a recent news article from a web-based news provider, a reasonable variation in responsiveness and an occasional dropped connection may be acceptable. However, for many business-related data transmissions, such as stock quote services and stock purchase order services provided by online stock traders, or for high-bandwidth software package deployments originating at a software development center, more stringent performance, reliability and security needs may exist. In such environments, a customer of the provider network may need a greater level of network isolation and control than is generally available over the public Internet. For example, the customer may wish to establish, if possible, dedicated private network links between the customer's own network and the provider network, such that the only traffic transmitted over those links is traffic generated on behalf of the customer and in accordance with policies established by the customer. Providers of such dedicated private links may wish to bill the customers for whom such links are set up based on, for example, the link usage levels. In a complex provider network with hundreds or thousands of different resource collections each providing billable services to clients, where some of the clients may have various dedicated private links set up while others do not, the problem of determining how much traffic is transmitted on behalf of which client at various points in the network may become complicated. In addition, in such complex networks there may often be periods over which network paths are underutilized, thereby resulting in a suboptimal return on the network operators' investments on networking equipment.

BRIEF DESCRIPTION OF THE DRAWINGS

FIGS. 6a and 6b illustrate examples of constituent elements of service metering records and link metering records respectively, according to at least some embodiments.

Figure 1:
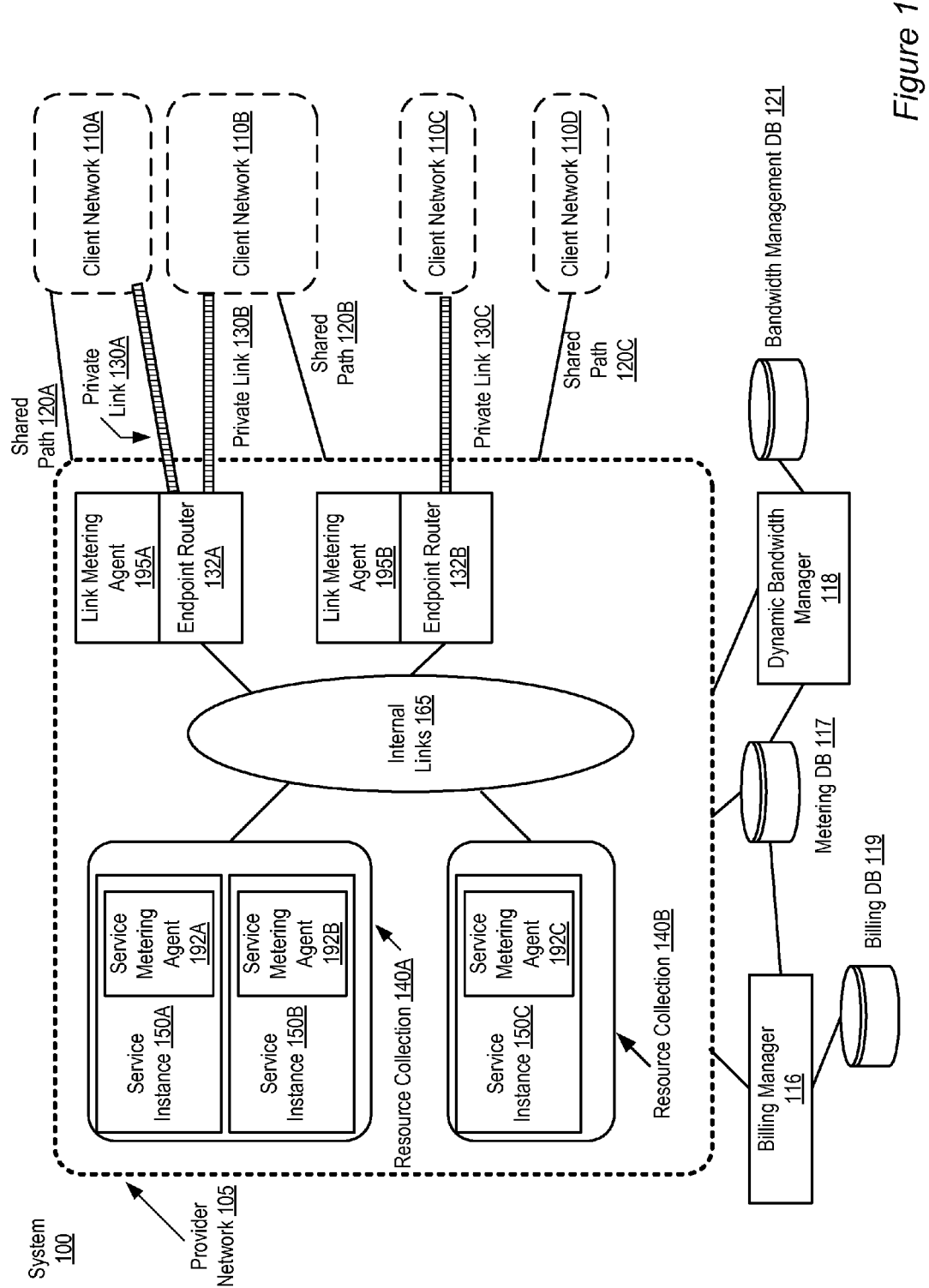
FIG. 1 illustrates an example system, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to."

DETAILED DESCRIPTION OF EMBODIMENTS

Various embodiments of methods and apparatus for differential bandwidth metering and dynamic bandwidth management for networks with direct peerings are described. Networks set up by an entity such as a company or a public sector organization to provide one or more services accessible via the Internet (such as various types of cloud-based computing or storage) to a distributed set of clients may be termed provider networks in this document. Such a provider network may include numerous data centers hosting various resource pools, such as collections of computer servers, storage devices, networking equipment and the like, needed to implement and distribute the services offered by the provider. Each client of a provider network may wish to transmit requests to the provider network from a client network comprising the client's own set of devices (e.g., servers, desktop or laptop systems, and the like).

In order to extend the geographical areas over which its services can be accessed with desired levels of performance, reliability and security, an operator of a provider network may establish dedicated private network paths between its main data centers and one or more routers that are physically located at a facility remote from the data centers. Such routers owned or managed by, or on behalf of, the provider network operator are called "endpoint" routers in this document, as they may represent the furthest points to which the provider network's control or ownership of network equipment extends. For example, only traffic that has passed through a device owned or managed by the provider network operator, and therefore complies with policies set by the provider network operator, may be allowed on the private paths between the endpoint routers and other components of the provider network.

Using a variety of approaches, the operator of the provider network may collaborate with a client to establish one or more private links from an endpoint router to a client router of the client's network, e.g., to provide enhanced performance and enhanced security for communications between the client network and the resource collections allocated to the client. In some embodiments, for example, a programmatic interface through which connectivity-related requests from clients are handled may be implemented by the operator of the provider network, and the interface may be used by the client to obtain instructions for setting up and configuring the private links. In other cases the client may communicate using more traditional means such as telephones, e-mail or physical mail with the operator of the provider network and/or other third-parties (such as operators of router housing facilities, last-mile connectivity providers and the like) that may need to be involved in setting up the links. The direct dedicated private links, which may also be referred to as cross-network links, may for example comprise a cable linking a physical port at an endpoint router with a physical port at a client network router, with both the endpoint router and the client router co-located at the same physical facility or network data center. In some cases the private links may not explicitly require a new physical link between a client's network and the provider network's endpoint router; instead, for example, the private link may be set up with the help of third party providers that may be able to use networking protocols and/or portions of existing network infrastructure to provide the desired private connectivity. After the private links are set up, a client may in some embodiments establish a plurality of logically-isolated network paths that share the same private link for traffic between the client network and one or more service instances implemented at resource collections allocated to the client. Various network isolation mechanisms may be used to isolate the traffic in different implementations, such as VLAN tags. The private links may be termed "direct connect" links herein, and the logically-isolated network paths may be termed "logical connections".

There may be multiple points within the provider network at which network traffic may be measured. For example, at the resource collections, network traffic may be measurable on a per-service level for each client making service requests. Each service may require a client to authenticate itself at the beginning of a client session, before a requested task or set of tasks is performed, and a service metering agent associated with the service may collect traffic measurements indicating how much network traffic the client generated for that service. At the endpoints where the direct connect links are set up, it may also be possible for link metering agents to measure how much traffic is flowing on each private link, and to associate that traffic with the client for whom the link was set up. Thus, even though individual network packets themselves may not have identification information of the client or clients for whom the packet is being transferred, metering agents may be able to measure client traffic at some level of aggregation both at the resource collections (where the services are performed) and at the direct connect links (where traffic enters and leaves the provider network) in some embodiments. Since traffic flowing over a direct connect link may be targeted at (or received from) a service instance at a resource collection, a given network packet may potentially count towards multiple traffic measurements at different points in the provider network.

In one embodiment, a billing manager may be operable to obtain different sets of summed traffic measurements for the services and the direct connect links, and generate billing information for each client based on the client's usage of the links and services and on the billing policies agreed to with the client. In one provider network, for example, the default billing behavior may be that each client that requests a service should be billed for the network traffic that is generated at the corresponding resource collection for that service, and every client that uses a dedicated private link should be billed for traffic that flows through the link. Because of the potential for traffic being counted multiple times, e.g., once during service-related traffic measurement and once during direct connect measurement, different billing policies may be used to override the default behavior. One such billing policy may, for example, indicate that the billing manager should charge the client at certain rate for the traffic that passes through the client's private links, but that the client should not be charged again for that same traffic being measured at the resource collections for services requested by the client. In an embodiment where such a billing policy is implemented, the billing manager may obtain, e.g., from the various metering agents, both a direct connect traffic summation metric for the client and a service traffic summation metric. The service traffic metric may sum up, for example, all the traffic transmitted to or from one or more resource collections on behalf of the client to obtain a service or services at the resource collection during a given time period, such as a month or a week. The direct connect traffic metric may sum up, for example, all the traffic transmitted over a given direct connect link that is allocated to the client, over the same time period. The billing manager may then, in such an embodiment, provide composite billing information to the client for the client's network traffic usage. In accordance with the billing policy, the composite billing information may include a first billing amount dependent on the direct connect traffic metric, and a second billing amount that depends on the difference (if any) between the service traffic metric and the direct connect traffic metric. For example, if during a given billing period, ten gigabytes of traffic were measured at the resource collections and six gigabytes were measured at the direct connect link or links, the client may be charged only once for the six gigabytes (at the rates applicable for direct connect traffic), and service-related charges would be applied to the four remaining gigabytes of the ten gigabytes of service-related traffic originally measured. Different billing policies may be in effect for different clients, and at different times for the same client, in some embodiments. For example, according to one billing policy, the billing manager may be required to minimize the total bill, so that if two different billing rates could be applied to a given traffic measurement amount (e.g., if either a service-determined rate or a direct connect rate is applicable), the lower of the two rates would be chosen.

In another embodiment, a dynamic bandwidth manager may be implemented, e.g., to increase the utilization of the available network bandwidth during periods in which there may be excess network capacity beyond the amount being used by various clients. Each client may provide its bandwidth configuration settings to the dynamic bandwidth manager, comprising for example a baseline direct connect traffic transmission rate for the client. The baseline transmission rate may indicate a current rate of direct connect traffic for which the client has agreed to pay at a certain billing rate, e.g., 1 Gbits/second at one cent per 100 Mbits. With the help of the metering agents at the direct connect links, the resource collections and/or elsewhere in the provider network, the dynamic bandwidth manager may gather measurements of actual traffic usage. In some embodiments, the dynamic bandwidth manager may determine the difference between measured traffic transmission rate over a path between the client's network and resource collections allocated to the client, and the peak transmission capacity of that path. If this difference exceeds a threshold value (e.g., if only 20% of the peak capacity is currently in use) the dynamic bandwidth manager may initiate a transmission of an indication such as a routing signal to the client network indicating that more bandwidth is currently available than the previously agreed-to baseline rate. Such a routing signal may be transmitted, for example, using a routing protocol message, e.g., a Border Gateway Protocol (BGP) message within which the value of a particular attribute indicates the change in available bandwidth. If the client wishes to take advantage of the extra bandwidth, the client may respond to the signal by increasing its traffic rate. In some embodiments, additional information such as the pricing for the newly-available bandwidth may also be transmitted to the client, and the client may take the pricing information into account when deciding how to respond to the signal. In some embodiments, dynamic changes in pricing may be communicated to the billing manager to help in preparing accurate composite billing information.

Example System Environment

FIG. 1 illustrates an example system environment, according to at least some embodiments. The system 100 may include a provider network 105 with a plurality of resource collections 140, such as resource collections 140A and 140B, maintained to provide various services to clients, such as cloud computing services or cloud storage services. Each resource collection 140 may include a set of resources (for example, computer servers, storage devices, network devices, etc.) on which various service instances 150 may be set up, such as a virtual computer instance, a storage pool instance and the like. In the illustrated embodiment, for example, resource collection 140A comprises service instances 150A and 150B, while resource collection 140B comprises service instance 150C. The services provided at resource collections 140 may be accessed from various client networks 110, such as client networks 110A, 110B, 110C and 110D, through various network paths. For example, client network 110A may have a dedicated private link (i.e., a direct connect link) 130A to an endpoint router 132A of the provider network 105, and may also be able to access provider network 105 via various shared paths (i.e., paths on which traffic generated by or on behalf of other clients may flow), such as shared path 120A. A shared path such as 120A may, for example, comprise portions of the public Internet or other networks set up by parties other than the operator of the provider network. Similarly, client network 120B may access the provider network 105 using private link 130B to endpoint router 132A, as well as via shared path 120B. The term "path" as used herein, broadly refers to the set of links and devices traversed by a network message or packet between a source device and a destination device. The set of links of a given path may, in some cases, comprise a single wire, as when the source and destination may be linked directly by a physical cable. In other cases the path may include multiple wired and/or wireless links and several intermediary devices such as switches, gateways, routers and the like. Paths may comprise unidirectional and/or bidirectional physical links. In some embodiments, a client network such as client network 110D may have access to the provider network 105 only via shared paths such as 120C, while other client networks such as client network 110C may have access only through direct connect links such as link 130C to endpoint router 132B. A direct connect link 130 may be implemented with the help of third-party providers in some embodiments, and may not require a new physical link to be set up between an endpoint router 132 and a client network 110. Within the provider network 105, various internal links 165 may link the endpoint routers 132 to the resource collections 140 where the service instances 150 are implemented.

The system 100 may also include a variety of metering agents configured to collect measurements of traffic generated on behalf of the clients in various embodiments. For example, in one embodiment each service instance 150 may have an associated service metering agent 192 (e.g., agent 192A for service instance 150A, agent 192B for service instance 150B, and agent 192C for service instance 150C) responsible for collecting network traffic measurements associated with the service instance. Such service metering agents 192 may, in one exemplary implementation, collect measurements at the network interface level for each service instance, indicating how many bytes of traffic were sent or received for a given set of client-requested operations. In other implementations service-related traffic measurements may be taken at other levels of the software and/or hardware stack at the resource collections, e.g., at the application level or within the operating system or hypervisor in use at the service instance. Service metering agents 192 may in some embodiments periodically transmit metering records indicative of service-related network traffic to a metering database 117. In one embodiment the service metering agents may submit metering information to a dynamic bandwidth manager 118, in addition to, or instead of, transmitting metering records directly to a metering database 117. The dynamic bandwidth manager 118 may be responsible for making changes in available bandwidth known to clients, as described in detail below.

In addition to the service metering agents 192, the provider network 105 may also include link metering agents 195 for the direct connect private links 130 at endpoint routers 132, e.g., link metering agent 195A associated with endpoint router 132A and link metering agent 195B associated with endpoint router 132B. Each private link 130 may connect a physical router port at a client router within a client network 110 to a physical port at an endpoint router 132 in some embodiments, while in other embodiments a third-party provider such as a network services provider may implement the private link 130. Each physical port at the endpoint router may be allocated to the client whose client network is connected (either directly using a physical link, or indirectly with the help of a third party provider) via the port. In such embodiments, the link monitoring agents 195 may be operable to measure the traffic at each port separately, thereby allowing the traffic on each port to be associated with the client for whom the port is allocated. Link metering agents 195 may also be configurable in some embodiments to submit link metering records to metering database 117 and/or to a dynamic bandwidth manager 118.

In one embodiment, system 100 may include a billing manager 116 responsible for collecting metering records generated by the various metering agents 192 and 195, using the billing rates and policies in effect for various types of services and physical link usage by the clients, and providing billing information to the clients as per their billing preferences. For example, according to one billing policy in one embodiment, a billing manager 116 may obtain a metric "Sigma_S" summing up all the service related traffic measured for a particular client at various resource collections during a given billing period, and a second metric "Sigma_P" summing up all the traffic measured over private (i.e., direct connect) links 130 for that client during that same period. The billing manager 116 may then compute the difference "Delta_SP" by subtracting Sigma_P from Sigma_S. If Delta_SP is greater than zero, i.e., if there was more cumulative service-related traffic than cumulative private link traffic, the billing manager 116 may then compute two billing amounts in accordance with the billing policy in place: a private link billing amount A_Direct_Connect dependent on Sigma_P and an average private link billing rate RP, and a differential billing amount A_Differential that depends on Delta_SP and an average service billing rate RS. A_Differential may be computed, instead of for example simply charging the client an amount based on the cumulative service traffic Sigma_S and RS, in order to avoid billing the client twice for the same traffic—once for the traffic as it flows over the private link 130 and again for when it reaches (or starts from) the service instances 150 at resource collections 140. The billing manager 116 in this example may then provide composite billing information to the client, comprising A_Direct_Connect and A_Differential.

A variety of billing policies may be implemented in different embodiments, and as a result the computations performed by the billing manager 116 to arrive at composite billing information for various clients may differ. For example, in some embodiments, a given private link 130 may be used for traffic of two or more logically-isolated network paths, which may have been set up to allow clients to isolate traffic for one purpose (such as a corporate intranet with high demands for security) from traffic for another purpose (e.g., a publicly accessible web site set up by the client for its own customers to access using public links of the Internet). In such embodiments, the billing manager 116 may provide separate billing amounts for each logically-isolated path so that the client may be able to track the networking costs associated with each of the two types of operations. In other embodiments, as described in further detail below in conjunction with the discussion of FIG. 7, different client accounts may be linked for billing purposes, and the billing manager 116 may allow clients to view consolidated billing information for linked client accounts, which may include billing amounts dependent upon the ratio of traffic generated on behalf of each account. In some embodiments, different services or service instances may have different billing rates associated with them, and the billing manager may have to take the service-specific billing rates into account instead of, for example, using an average service billing rate when computing the composite billing information. Similarly, in some environments different private links 130 set up on behalf of the same client may have different billing rates associated with them, and such different rates may have to be taken into account as well. In embodiments where pricing is dynamically changed, e.g., where a dynamic bandwidth manager 118 advertises varying rates to clients at different points in time as described below, the billing manager 116 may have to take such pricing variations into account. The billing manager 116 may store billing data, such as billing policies, preferences and rates in effect for various clients, within a billing database 119 in some embodiments.

System 100 may include a dynamic bandwidth manager 118 (which may be referred to herein as a DBM) in some embodiments. The dynamic bandwidth manager 118 may be responsible for, among other functions, communicating changes in available bandwidth levels to the clients, e.g., using routing protocol messages or other signals, thus allowing those clients that are able to use increased bandwidth to benefit from variation in network traffic over time. The DBM 118 may also obtain dynamic bandwidth preferences or settings from clients, comprising for example such information as the current baseline bandwidth that the client has agreed to pay for, a maximum price the client is willing to pay for additional bandwidth, and so on. In one embodiment, the DBM 118 may compute a current or recent traffic transmission rate along one or more paths between a client network 110 and one or more resource collections 140, e.g., using information provided by link metering agents 195 and/or the service metering agents 192. The DBM 118 may subtract the current traffic rate from the peak or rated capacity of the path or paths to arrive at an estimate of the current excess capacity that could be used by interested clients. If the difference between the peak capacity and the current transmission rates exceeds a threshold, in some embodiments the DBM 118 may initiate a transmission of a routing signal to the client network to indicate that the client may be able to transmit more traffic than its current baseline level. For example, in one implementation, the DBM 118 may send a request to an endpoint router 132 to transmit a BGP message to a client network with a community attribute set to a particular value, thereby informing the client of the available bandwidth. Different types of routing protocols may be used in various embodiments, and different message types and attributes may be employed to transmit the indication of bandwidth availability. In some embodiments the manner in which the indication is transmitted may be selectable by the clients, e.g., in the bandwidth configuration settings they provide to the DBM 118, clients may indicate their preferred notification or signaling mechanisms. Such client preferences and settings may be stored in a bandwidth management database 121 in some embodiments.

In one embodiment a DBM 118 may also make pricing modifications, e.g., by lowering prices when there is a lot of excess bandwidth available, and/or by raising prices as the amount of excess bandwidth decreases. The DBM 118 in such an embodiment may also communicate the pricing changes to clients, e.g., by updating a web page, or using some other communication mechanism. Pricing changes may also be communicated via routing protocol messages in some embodiments. A DBM 118 may be responsible for receiving client bandwidth setting updates as well in some embodiments—e.g., when a client wished to perform a data intensive computation requiring a large amount of data transfer, it may send a signal to the DBM indicating that it is willing to pay a higher rate than the default or current rates in effect. Such client notifications may induce the DBM to repeat its computations of currently available excess bandwidth in some implementations, to see if the client's needs for more bandwidth can be met.

Direct Connect Link Establishment and Usage

Figure 2:
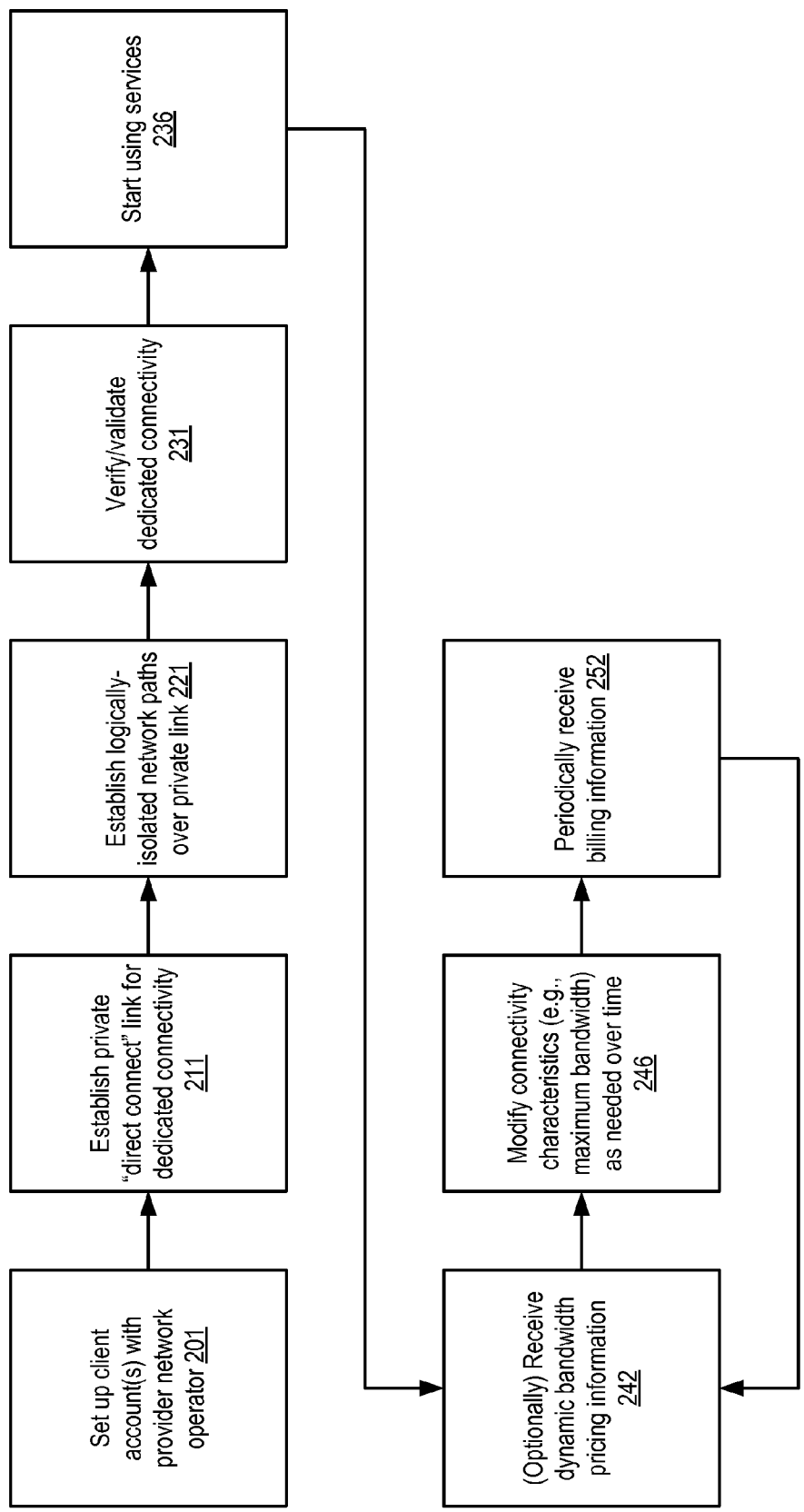
FIG. 2 provides a high level overview of steps that may be taken to establish and utilize dedicated connectivity between a client network and a resource collection, according to at least some embodiments.

FIG. 2 provides a high level overview of steps that may be taken to establish and utilize private (i.e., direct connect) links 130 between a client network and a resource collection, according to at least some embodiments. As shown in the entry labeled 201 in FIG. 2, the process may begin with a client setting up one or more client accounts with an operator of provider network 105, e.g., through a programmatic interface such as a web interface or a GUI provided by the operator. Client accounts may have associated billing policies, e.g., specifying various recurring and non-recurring costs for compute, memory and networking resources, including network traffic-based billing rates for services and for direct connect links. In one embodiment, linked billing relationships may be established between different client accounts: e.g., a first client of the provider network, Client_A, may request that a second client Client_B's billing account be linked to Client_A's, and that the billing manager provide consolidated billing information for the linked accounts. Billing linkage may be useful, for example, when Client_B in such an example is a customer of Client_A, and Client_A serves as an intermediary for billing purposes between the provider network and Client_B. Linked billing accounts may also be set up for different organizations of a single large client—e.g., both an Information Technology (IT) department and a Software Engineering department within a given corporation may use the provider network, and linked accounts may be set up for the two departments as children accounts of a parent corporate account. In some implementations a distinction may be made between client user accounts and client billing accounts: e.g., multiple users from within a client network may utilize the services of the provider network, and they may all share a single billing account, i.e., a single bill may be generated combining the charges incurred by all the users.

A client that has an account set up may use facilities or instructions supported by the operator of provider network 105 to first establish one or more direct connect private links 130 for dedicated connectivity (entry 211 in FIG. 2). For example, the client may be given instructions specifying which physical port of an endpoint router 132 should be connected to a client-side router, where the endpoint router is located (e.g., in which rack in which data center), and so on. After establishing a private link 130 as per the instructions, a client may then establish one or more logically-isolated network paths that use that private link (entry 221). The functionality of the dedicated connectivity may be verified or validated (entry 231), e.g., in some embodiments the client and/or a connectivity coordinator within the provider network operator may perform one or more verification operations and confirm that the client can successfully communicate with the provider network over the link 130, and that traffic over the link is isolated in accordance with the desired configuration of logically-isolated paths.

After the private link and the logically-isolated paths have been established, the client may set up and begin utilizing service instances 150 at resource instances 140 allocated for the client (entry 236) in accordance with the billing policies and rates in effect for the client's accounts. In embodiments where a dynamic bandwidth manager 118 is implemented and can change traffic-related pricing, or the billing manager 116 can change pricing, the client may receive updated bandwidth pricing information (element 242) from time to time. In one embodiment a client may update its connectivity characteristics as needed (element 246), e.g., by requesting a change to its baseline bandwidth, by specifying a new price it is willing to pay for additional bandwidth, and the like. Based on the billing policy in effect, the client may receive billing information periodically (element 252), e.g., from the billing manager 116.

Logically-Isolated Connections Sharing Direct Connect Links

In many cases a client may be interested in using resource collections 140 for a variety of different purposes—for example, a software vendor may wish to use one set of resources to set up a development and build environment for its software engineers, another set of resources for an intranet for storing and sharing corporate information internally within the company, and a third set of resources for a web site that may be accessed by the software vendor's customers. Such a client may desire, for example for administrative purposes, accounting/billing purposes, and/or security purposes, that the network traffic for each set of resources be isolated from the traffic for the other sets of resources. The software vendor may wish to ensure that the build-related traffic be kept separate from the intranet traffic, that traffic from the build machines or resources may not be permitted to reach one or more intranet servers, and so on. At the same time, such a client may wish to utilize the same links 130 provided via an endpoint router 132 for all these different functions.

Figure 3:
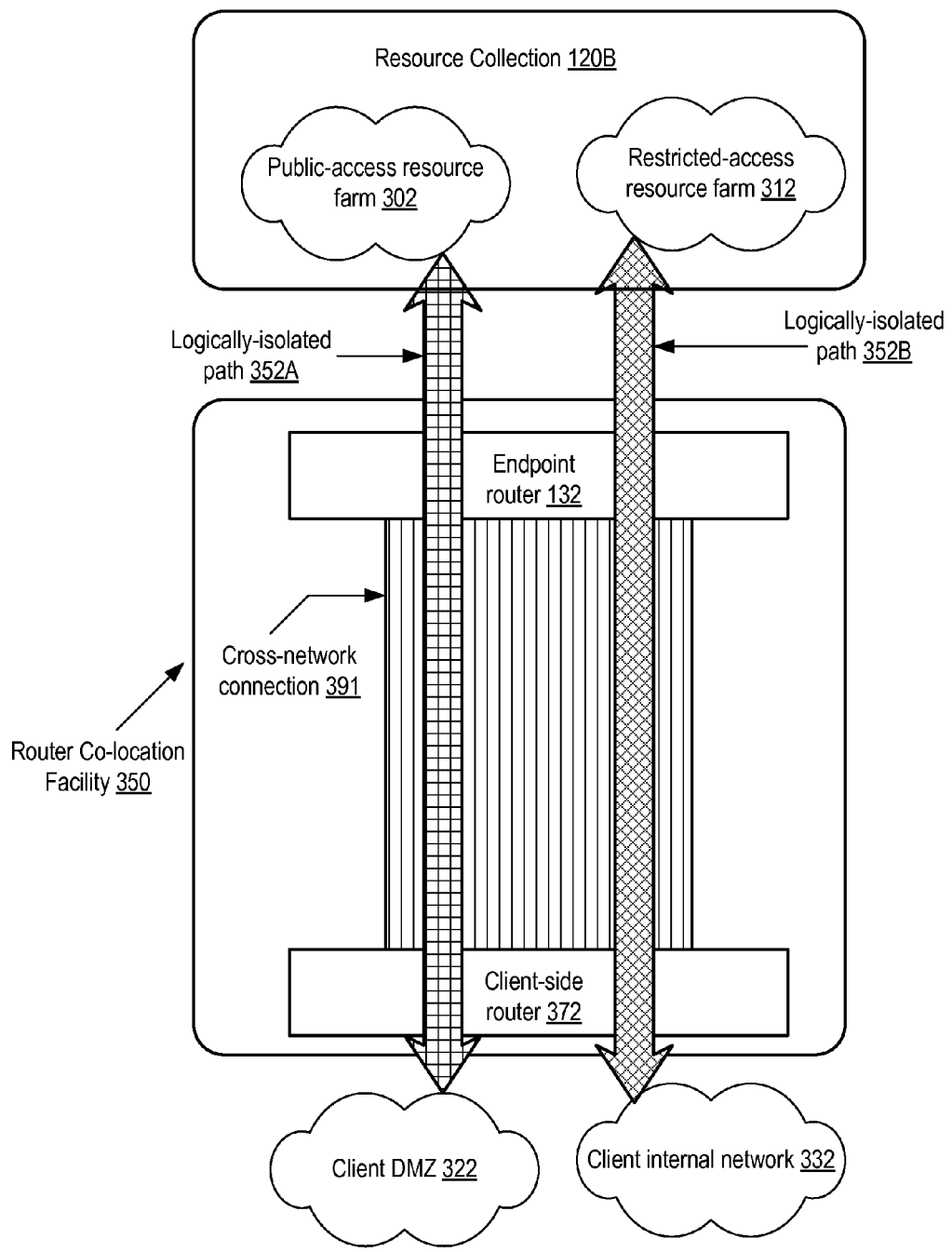
FIG. 3 illustrates an example of two logically-isolated network paths sharing a single private link, according to at least some embodiments.

FIG. 3 illustrates an example of two logically-isolated network paths 352A and 352B sharing a single dedicated physical link (cross-network connection 391), according to at least some embodiments. In the environment shown in FIG. 3, the client requires connectivity to be established and maintained between internal network 332 and a restricted-access resource farm 312. At the same time the client has set up a de-militarized network zone (DMZ) 322 (which may also be termed a perimeter network)—a sub-network of the client network 110 that may expose some of the client's services to the public or untrusted Internet via public-access resource farm 302 within provider network 105's data centers. To ensure that the traffic for both the restricted-access resource farm 312 and the public-access resource farm 302 meets desired performance, security and cost requirements, the client may first establish a dedicated physical link such as cross-network connection 391 between a client-side router 372 and an endpoint router 132, using for example some of the steps illustrated in FIG. 2. The client and may then request the establishment of two logically-isolated paths that share the cross-network connection 391: a path 352A for traffic between DMZ 322 and the public-access resource farm 302, and a path 352B for traffic between the client's internal network 332 and restricted-access resource farm 312. A client's request to set up the logically-isolated path may specify various criteria for network isolation, such as a unique VLAN tag to be used for the path, a BGP Autonomous System Number (ASN), a set of network prefixes, and/or virtual private gateway information. For example, a unique VLAN tag, such as an IEEE 802.1Q standard-compliant tag, could be inserted within network packet headers to distinguish traffic of one logically-isolated path from the traffic of other logically-isolated paths. In response to a request to establish the logically-isolated paths, the appropriate routing configuration information may be propagated to various network devices to implement the desired network isolation. In some implementations a separate billing account may be set up for each logically-isolated path, e.g., so that the client can distinguish the traffic and costs associated with the public-access resource farm the traffic and costs associated with the restricted-access resource farm. In one embodiment a direct connect link or private path may be set up without a need for a new physical link directly connecting the client-side router and the endpoint router—e.g., networking infrastructure belonging to or owned by a third party may be used.

Traffic Metering for Services at Resource Collections

Figure 4B:
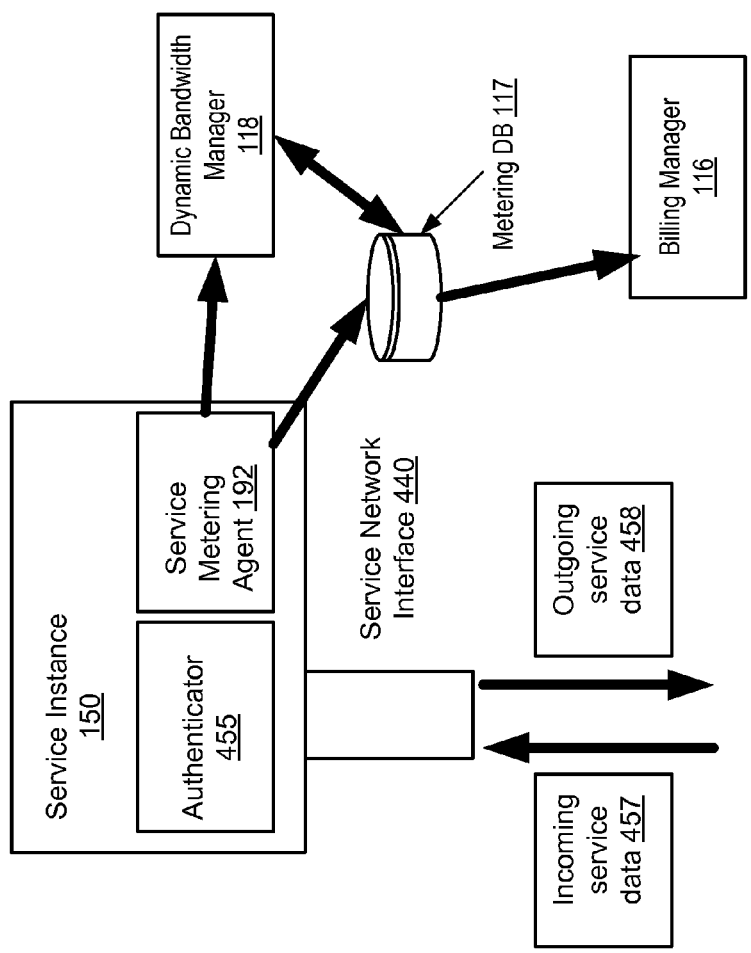
FIGS. 4a and 4b illustrate an example of operations involved in measuring network traffic associated with services provided at a resource collection, according to at least some embodiments.
Figure 4A:
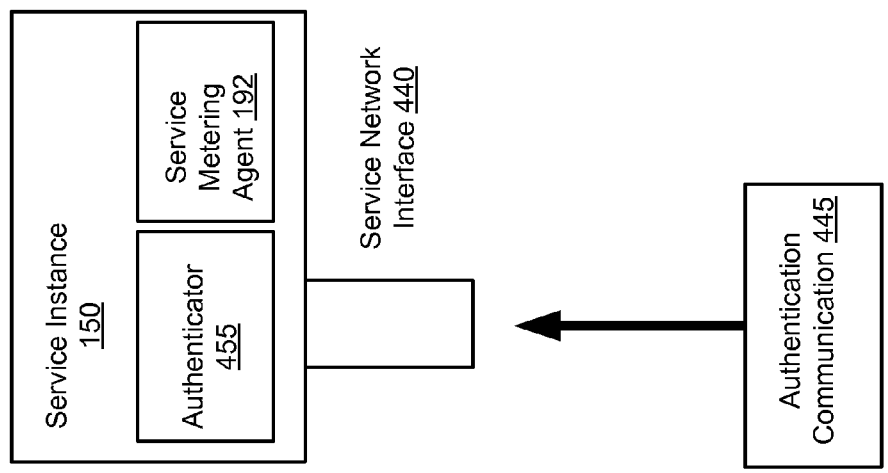

FIGS. 4a and 4b illustrate an example of operations involved in measuring network traffic associated with services provided at a resource collection 140, according to at least some embodiments. As shown in FIG. 4a, a given service instance 150, such as a virtualized computer system running some desired software stack, may include an authenticator 455 and a service metering agent 192. In order to obtain desired services from the service instance 150 during a given client session, a client may first need to authenticate itself, e.g., via an authentication communication 445 that may be received at the service interface via a network interface 440. The authentication communication 445 may, for example, comprise the client providing a user identifier and a password that the authenticator 455 can verify. Upon successful authentication, the session (and any traffic generated during the session) may be associated with a client billing account, and data transfers for the session may begin. The client may submit service requests via the network interface 440, and the service instance 150 may respond, which may also result in traffic over the interface 440. A client session may end either due to the client explicitly requesting session termination (e.g., by logging out), or due to a session timeout.

As shown in FIG. 4b, the service metering agent 192 may monitor incoming service-related data 457 received at the network interface 440, as well as outgoing service-related data 458 sent from the network interface 440. In one implementation, network traffic counters within the software stack (e.g., in a layer of a hypervisor, operating system, or application) may be used to keep track of incoming and outgoing traffic. Service metering agent 192 may, in some embodiments, periodically transfer metering records indicating the amount of traffic measured for a given client for a given service to a metering database 117. The granularity at which service metering records are generated and/or transmitted may vary in different implementations, and may be tunable: for example, a metering record for a given (service, client) combination may be generated every minute in one implementation, and every fifteen minutes in another implementation. In embodiments where a dynamic bandwidth manager 118 is present, some or all of the measurements may be transmitted to the DBM 118 as well or instead of being stored directly in the metering database 117. A DBM 118 may be configured to store metering information it receives in the metering database 117, and/or read metering information from the metering database as needed. A billing manager 116 may retrieve metering records generated by the service metering agent 192 as needed from the metering database 117.

In the embodiment illustrated in FIGS. 4a and 4b, a service metering agent 192 is shown incorporated within a service instance 150. In some embodiments, service metering agents may be independent of or external to the service instances—e.g., traffic related to a service may be monitored using a network tap, sniffer, or similar mechanism that may also be able to allocate network packets to different client accounts by analyzing the packet contents. In one embodiment a single service metering agent 192 may be capable of monitoring traffic associated with several service instances 150. While FIGS. 4a and 4b illustrate an embodiment in which a service metering agent 192 is configured to measure traffic at the network interface level, in other embodiments the traffic may be measured at other levels of the software/hardware stack.

Traffic Metering for Direct Connect Links

Figure 5:
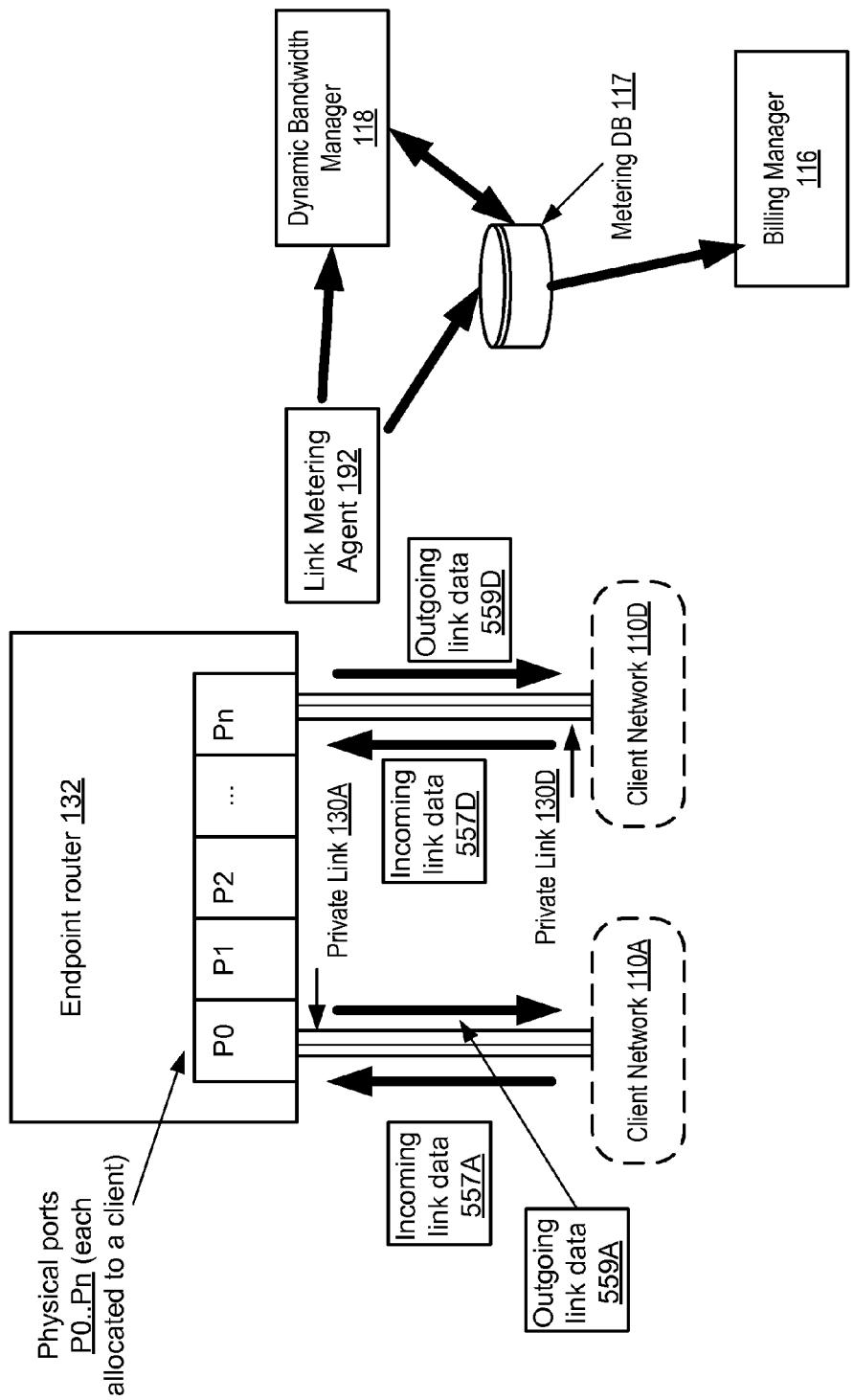
FIG. 5 illustrates an example of operations involved in measuring network traffic associated with private network links, according to at least some embodiments.

FIG. 5 illustrates an example of operations involved in measuring network traffic associated with direct connect private links 130, according to at least some embodiments. As shown, an endpoint router 132 of a provider network 105 may include a plurality of physical ports P0 . . . Pn. Each of the physical ports may be allocated to a client of the provider network that wishes to set up a direct connect link between its client network and the provider network. In the illustrated example, client network 110A is linked to port P0 via a dedicated physical link 130A, and client network 110D is linked to port Pn via dedicated physical link 130D. A link metering agent 195 may be configured to measure incoming and outgoing traffic over each dedicated link 130, and associate that traffic with the client account corresponding to the client for whom the dedicated link was set up. For example, incoming link data 557A and outgoing link data 559A over link 130A may be associated with the client owning/managing client network 110A, and incoming link data 557D and outgoing link data 559D may be associated with the client owning/managing client network 110D. As noted earlier, in some embodiments the direct connect private links may be implemented using third parties, e.g., without setting up new physical links between a client network 110 and an endpoint router 132.

A link metering agent 195 may use any of various measurement techniques in different embodiments. For example, the endpoint router 132 may maintain counters for incoming and outgoing traffic over each port in some embodiments, while sniffers or network taps may be used in other embodiments. While in FIG. 5 the link metering agent is shown external to the endpoint router 132, in other embodiments the link metering agent may be incorporated within the router. A single link metering agent 195 may be responsible for monitoring direct connect traffic for several routers in some embodiments. In some embodiments link traffic may be allocated to client accounts based on the contents of the packets, rather than on the physical ports used. In one embodiment the traffic measured on a given direct connect link may be further classified based on the logically-isolated network path to which it belongs (e.g., using VLAN tags as described earlier).

The interactions between link metering agents 195 and the metering database 117, dynamic bandwidth managers 118 and billing managers 116 may be similar to the interactions between those entities and the service metering agent 192 described above. Link metering agent 192 may, in some embodiments, periodically transfer metering records indicating the amount of traffic measured over a given link 130 (and therefore associated with a given client account) to a metering database 117. The granularity at which link metering records are generated may also vary in different implementations, and may be tunable: for example, a metering record for a given link 130 may be generated every five minutes in one implementation, and every ten minutes in another implementation. In embodiments where a dynamic bandwidth manager 118 is present, some or all of the link traffic measurements may be transmitted to the DBM 118 as well or instead of being stored directly in the metering database 117. A DBM 118 may be configured to store link metering information it receives in the metering database 117, and/or read metering information from the metering database as needed. A billing manager 116 may retrieve metering records generated by the link metering agent as needed from the metering database 117.

In some embodiments, different metering databases may be implemented for private link measurements than for service measurements. In other embodiments, the service metering agents and link metering agents may transmit their measurements directly to dynamic bandwidth managers and/or billing managers, and may transmit metering records to metering databases. In one embodiment, traffic metering may be implemented at other points in the provider network in addition to the service instances 150 and the private links 130—e.g., at various network devices associated with the internal links 165 shown in FIG. 1, and metering records gathered at the internal links may also be sent to a metering database 117, a dynamic bandwidth manager 118 and/or a billing manager 116.

Contents of Metering Records

FIGS. 6a and 6b illustrate examples of constituent elements of service metering records and link metering records, respectively, according to at least some embodiments. In the illustrated embodiment, a service metering record 601 may include a metering start timestamp 602 and a metering end timestamp 604, indicating the time period over which the measurements were conducted by the service metering agent 192 that generated the record 601. A client account identifier 606 may indicate the client account on behalf of which the traffic was generated; the client account for a given client session or client request may have been determined as a result of a communication similar to authentication communication 445 of FIG. 4a. In embodiments where a client may have several billing accounts, or where several users may share a single billing account, a billing account identifier may be included in addition to or instead of the client account identifier. In some embodiments a service metering record 601 may include a service instance identifier 608 corresponding to the service instance 150 being monitored. A service interface identifier 610 may be included in embodiments where service traffic is measured at the network interface level. A service metering record may include separate measurements for incoming traffic (element 612) and outgoing traffic (element 614) in some embodiments; in other embodiments the incoming and outgoing traffic may be combined into a single measurement. Additional metadata associated with the service used, not shown in FIG. 6a, may be incorporated within service metering records in some embodiments.

A link metering record 651 as illustrated in FIG. 6b for one embodiment may include several elements similar to the elements of service metering record 601. For example, the link metering record 651 may also include start and end timestamps 652 and 654 indicating the time period over which measurements were made. In some embodiments a router identifier 656 and a physical port number 658 may also be included, identifying the location of the link 130 on which the measurements were made. A client account identifier 660 (and/or a billing account identifier) may be included as well. In one embodiment a logical connection identifier 668 may be used to indicate the logically-isolated network path (similar to paths 352A or 352B of FIG. 3) on which the traffic was transmitted. A link metering record may also include separate measurements for incoming traffic (element 662) and outgoing traffic (element 664) in some embodiments; in other embodiments the incoming and outgoing traffic may be combined into a single measurement. Additional metadata associated with the link 130 or the client, not shown in FIG. 6b, may be incorporated within link metering records in some embodiments.

As noted earlier, in some embodiments service metering records 601 and link metering records 651 may be transmitted to one or more metering databases 117 by the respective metering agents that generate them. In other embodiments, the records may be sent to dynamic bandwidth managers and/or billing managers, which may in turn store them in persistent stores if needed.

Contents and Linkage of Billing Accounts

Figure 7:
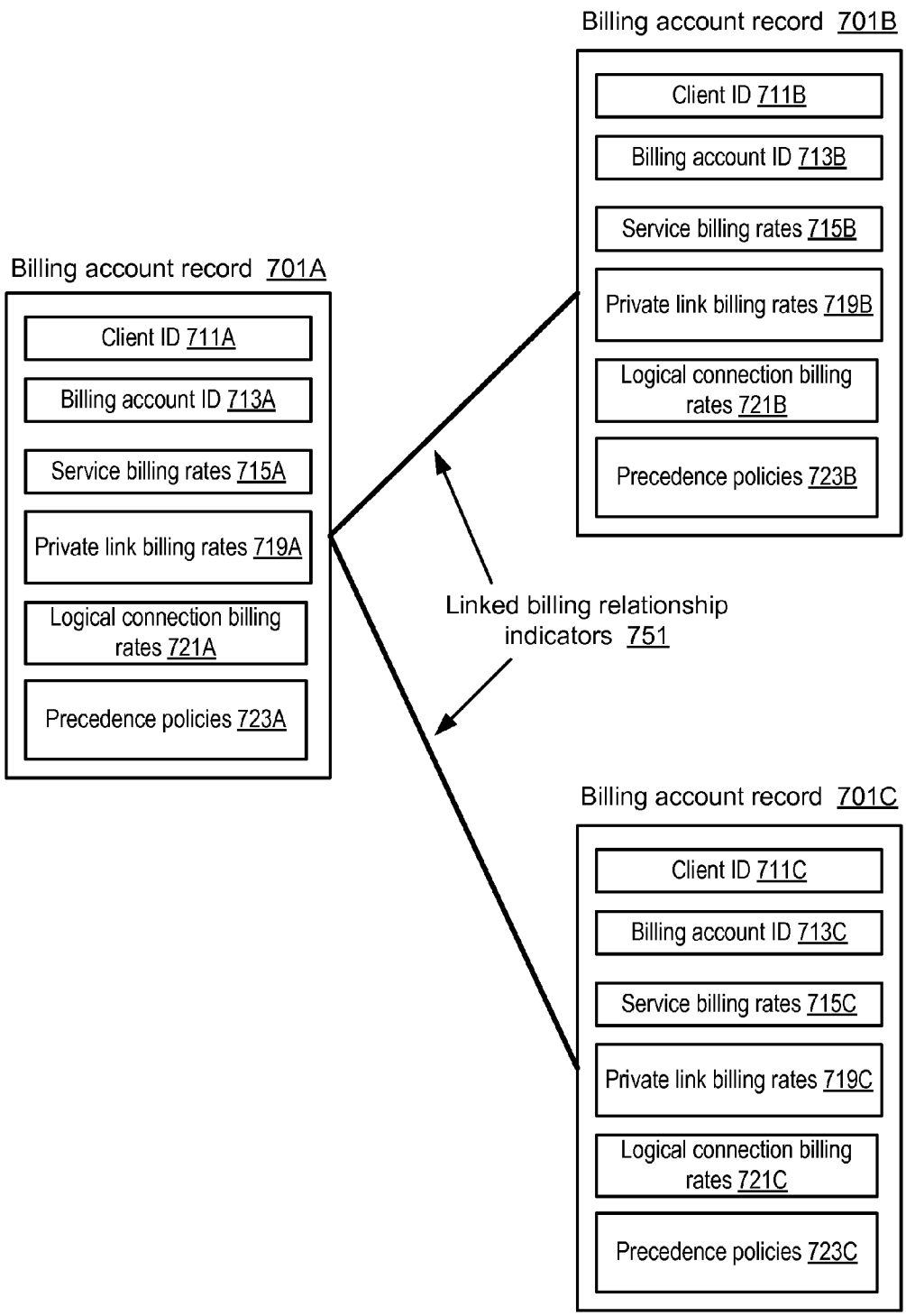
FIG. 7 is an illustration of example constituent elements of client billing account records, according to at least some embodiments.

FIG. 7 is an illustration of example constituent elements of client billing account records, according to at least some embodiments. Three billing account records 701A, 701B and 701C are shown. Billing account records 701 may be stored within a billing database 119 in some embodiments, and may be used by billing manager 116 as needed to prepare billing information for clients. As shown, a billing account record 701A may comprise a client identifier 711A. In some embodiments a given client may be allowed to set up multiple billing accounts; in such a case, a billing account record 701A may include an identifier 713A of the specific billing account in addition to the client identifier. If a client account has only one associated billing account, the client account identifier may also serve as a billing account identifier.

In some embodiments different services implemented at resource collections 140 may have different billing rates for their associated network traffic, while in other embodiments a common network transmission billing rate may be used for several different services. Different clients may be charged different billing rates for the same service type in some environments. A record 715A of the service traffic related billing rate or rates currently applicable may be stored in the billing account record 701A. In some environments, the service-related billing rates may be modified during a given billing period, and a record of the specific service-related billing rates applicable for different time periods may also be stored within element 715A. For example, a client may have agreed to a service billing rate of ten cents per gigabyte for a period Jan. 1-Jan. 10, 2012, and then on January 11 the billing rate may have changed to eight cents per gigabyte for the remainder of the month. In this example, the different rates (eight and ten cents per gigabyte) and the corresponding time periods (January 1-10 and January 11-January 31) may be stored in element 715A.

Private link billing rate information may be stored within an element 719A, and in embodiments where different rates for different logically-isolated paths are supported, the rates for different logical paths may be stored in an element 721A. As in the example of variable service billing rates described above, records of varying private link billing rates and/or varying logical path billing rates and the corresponding time periods for which the different rates are applicable may also be stored in elements 719A and 721A.

In some embodiments one or more billing policies, such as precedence policies 723A, may also be included within billing account records 701. A precedence policy may indicate the way in which a billing rate should be chosen when more than one billing rate may be applicable for a given traffic measurement. For example, if the billing rate for services is RS and the billing rate for private link traffic is RP, one precedence policy may specify that if there is a choice, RP should be applied rather than RS; another precedence policy may specify that the minimum of RS and RP should always be applied.

Billing accounts may be linked to each other in some embodiments, e.g., at the request of the clients involved. In the illustrated embodiment, linked billing relationship indicator 751 shows that billing account records 701B and 701C are both linked to billing account record 701A. Account linkage may be requested for a number of different reasons in different embodiments. A corporation may set up a single global client account as a parent account, for example, and may wish to set up different child billing accounts for different organizations within the corporation. The corporation may wish to obtain consolidated billing information for the global client account, and may desire the option of also obtaining individual billing information for each organization. In another example, a first client of the provider network 105 may have as its customer another client of the provider network, so that traffic generated over the first client's private link 130 may have been generated from a resource collection 140 allocated to the second client. The first client may wish to manage the billing of the second client's traffic, and may request that their billing account records be linked. The billing manager 116 may be responsible for providing consolidated billing information for linked accounts, depending on billing policies in effect.

A billing account record 701 may be set up, e.g., by a billing manager 116, when a client first sets up its client account with the provider network, as indicated in element 201 of FIG. 2. A client may issue various requests over time to change, link, or unlink its billing accounts, e.g., via an interface provided by the billing manager 116. In some embodiments a dynamic bandwidth manager 118 may also be involved in changing some of the contents of billing account records; for example, the dynamic bandwidth manager may change the billing rates offered to a client for a private link or for a service, and may inform the billing manager of changes, or of the rates to apply for a client for a given time period.

Example of Traffic Flow Over a Shared Direct Connect Link

Figure 8:
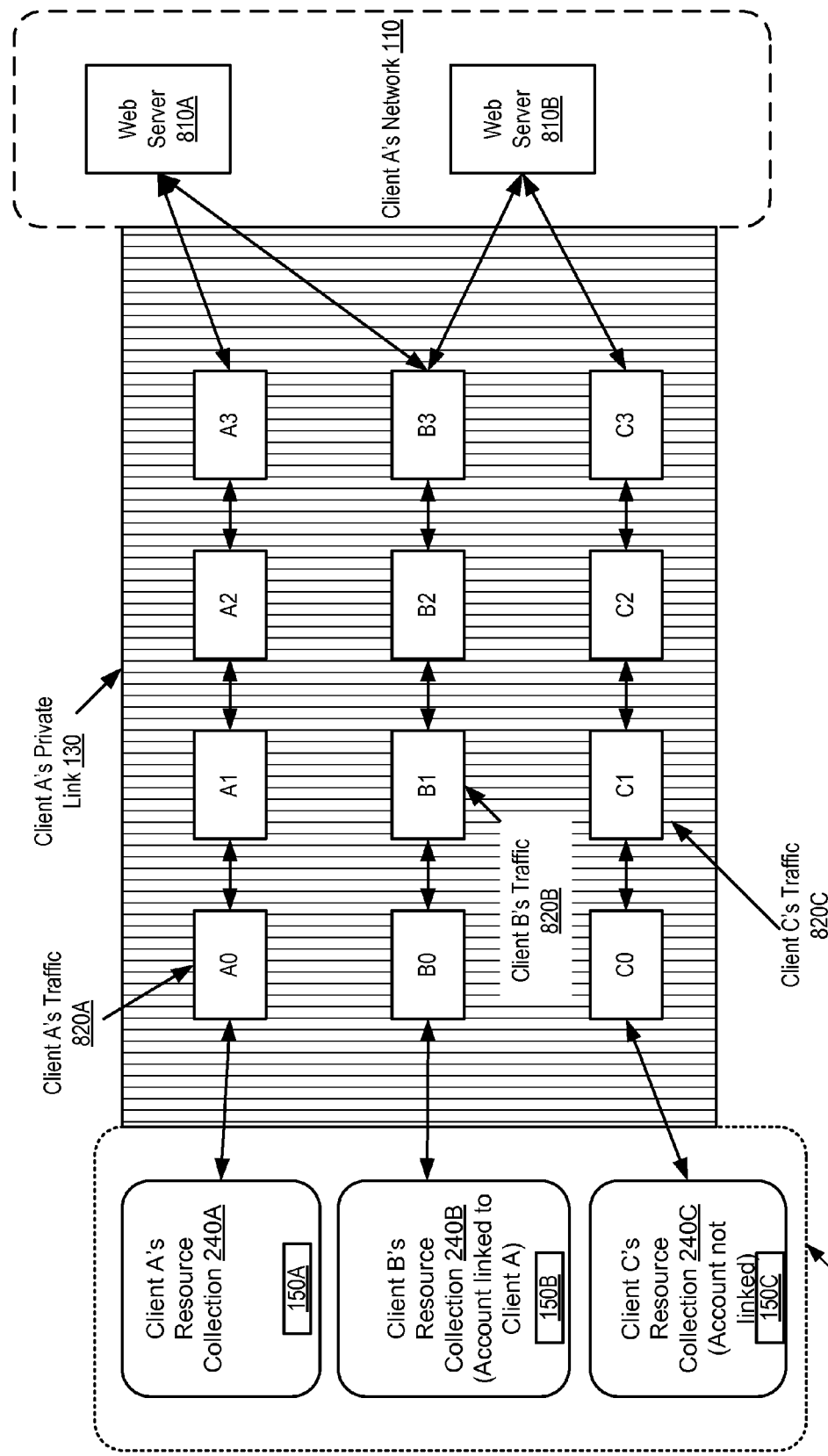
FIG. 8 is an illustration of traffic flow between several different resource collections and a client network over a single private link, according to one embodiment.

FIG. 8 is an illustration of traffic flow between several different resource collections and a client network over a single private link 130, according to one embodiment. The example may be helpful in illustrating the issues involved in apportioning measured traffic among multiple client accounts whose traffic happens to flow over a shared direct connect link. In FIG. 8, Client A's network 110 comprises two web servers 810A and 810B, and link 130 has been set up at Client A's request to connect client network 110 and provider network 105. Routing information related to the web servers 810A and 810B has been advertised, as a result of which traffic directed towards the web servers from within various resource collections 140 of the provider network may flow over the link 130. As shown, the cumulative traffic over the link 130 comprises one stream of traffic 820A associated with resource collection 240A, another stream of traffic 820B associated with resource collection 240B, and a third stream of traffic associated with resource collection 240C. Resource collection 240A includes service instance 150A that has been set up for Client A; resource collection 240B includes service instance 150B that has been set up for Client B; and resource collection 240C comprises service instance 150C that has been set up for Client C. The billing account of Client B is linked to that of Client A.

In the embodiment shown in FIG. 8, traffic may be measured at several points by various metering agents. Traffic flowing over the link 130, designated as TP, may be measured by a link metering agent 195, and, since the link is assigned to Client A, this traffic may be apportioned to Client A—i.e., Client A may be responsible for paying for the link traffic. In addition, service-related traffic may be measured at each service instance—traffic TS1 at service instance 150A, TS2 at service instance 150B, and TS3 at service instance 150C. In one example scenario, TP for a given month may be 15 Gigabytes, TS1 may be 20 Gigabytes, TS2 may be 10 Gigabytes, and TS3 may be 5 Gigabytes. The total measured service related traffic in this example is 35 Gigabytes (TS1+TS2+TS3), and the total link-related traffic is 15 Gigabytes (TP). Some or all of the link-related traffic may have contributed to the service traffic total. (The total service related traffic may exceed the link traffic because there may be alternative paths to the resource collections, i.e., paths that do not include the link 130.)

One billing policy that may be implemented by a billing manager 116 in this example scenario may be summarized as "charge the direct connect client at the direct connect rate for the traffic that flows over the private link; and distribute charges for any excess service related traffic proportionally, i.e., in the ratio of the service traffic totals generated for each client". Here the direct connect client is Client A, and so Client A may be charged for 15 Gigabytes of traffic at the prevailing direct connect billing rate. The "excess" service related traffic is 20 GB, obtained by subtracting TP from (TS1+TS2+TS3). This excess service related traffic may be apportioned as follows between the three clients, based on the respective ratios TS1/(TS1+TS2+TS3), TS2/(TS1+TS2+TS3), and TS3/(TS1+TS2+TS3). Client A would be charged for (20/35) times 20, or approximately 11.4 Gigabytes. Client B would be charged for (10/35) time 20, or 5.7 Gigabytes, and Client C would be charged for (5/35) times 20, or 2.9 Gigabytes. Since the billing accounts of clients A and B are linked, a linked service billing amount proportional to the sum of the service traffic portions allotted to those two clients (11.4+5.7, i.e., 17.1 Gigabytes) may be presented to Client A (or Client B) upon request by billing manager 116. The traffic apportioned to, and hence the billing amounts generated for, each client may differ depending on the billing policy in effect.

Methods for Billing Manager Functionality

Figure 9:
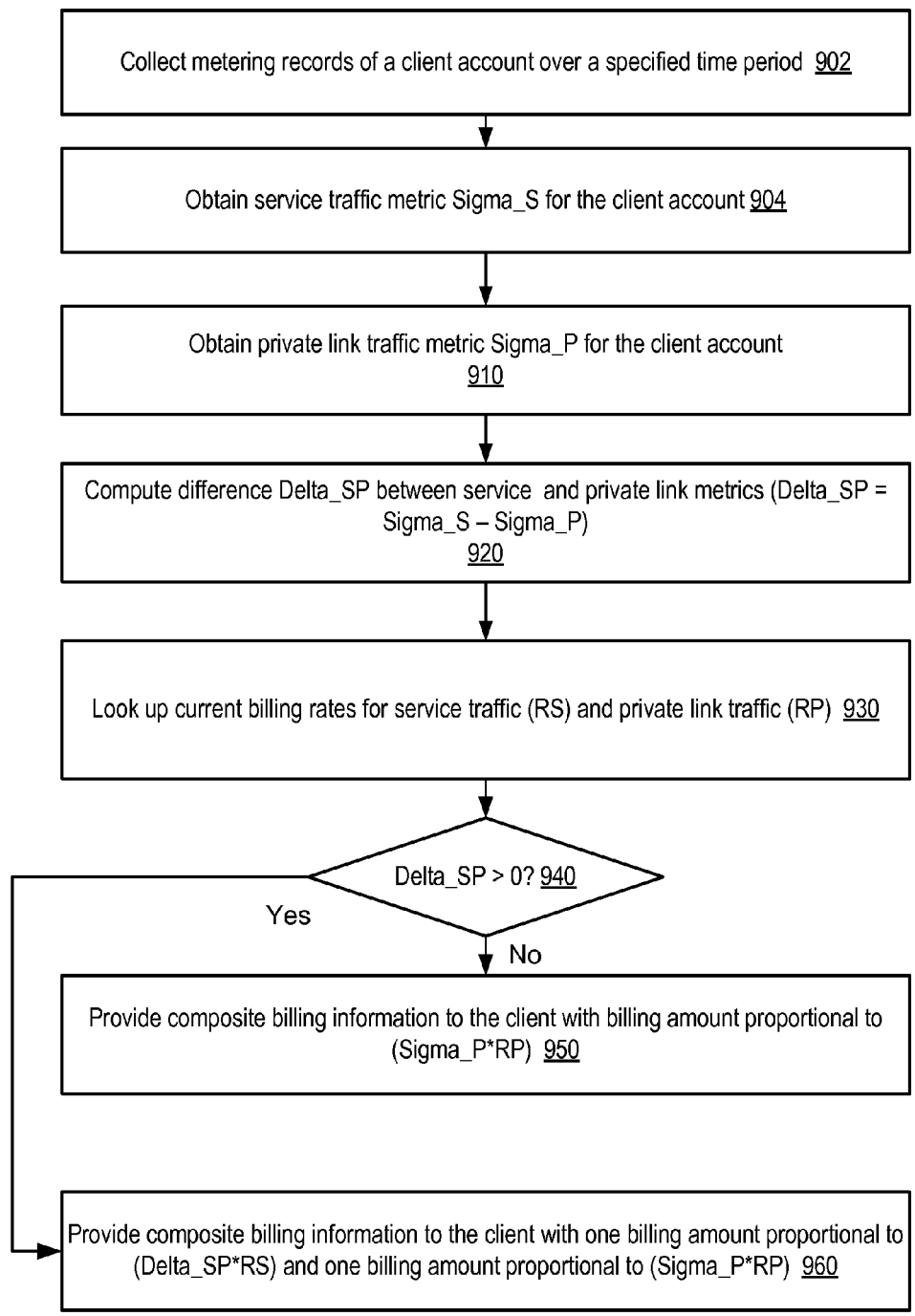
FIG. 9 is a flowchart illustrating aspects of the functionality of a billing manager, according to at least some embodiments.

FIG. 9 is a flowchart illustrating aspects of the functionality of a billing manager 116, according to at least some embodiments. As shown in element 902, the metering records of a client account over a specified time period, such as a week or a month, may be collected depending upon the billing period in use. Link metering records (such as record 651 of FIG. 6b) and service metering records (such as record 601 of FIG. 6a) may be obtained, e.g., from a metering database 117 in some embodiments. The link metering records may be collected for various links set up for the client, and the service metering records may be collected for various resource collections that have communicated with the client's network.

The billing manager 116 may then obtain a summation of the service-related traffic, designated as metric Sigma_S in FIG. 9 (element 904), and a summation of the private link traffic, designated as metric Sigma_P (element 910). The difference Delta_SP between the service related metric Sigma_S and the link-related metric Sigma_P may then be calculated (element 920). The billing manager may then obtain the current billing rates applicable to the client for service-related traffic (RS) and the billing rate for link-related traffic (RP), e.g., from the billing database 119 (element 950).

If Delta_SP is greater than zero (as determined in element 940), i.e., if the service-related traffic metric exceeds the private link-related traffic metric, in the embodiment illustrated in FIG. 9 the billing manager 116 may generate billing information for the client comprising two billing amounts (element 960). One amount may be proportional to the private link traffic metric Sigma_P and the private link billing rate RP. The other amount may be proportional to the "excess" service-related traffic, i.e., Delta_SP, and the service billing rate RS. By providing this differential billing amount, the billing manager may ensure that the client is not charged twice for the same traffic. If Delta_SP is not greater than zero, only the billing amount proportional to Sigma_P and RP may be provided, as shown in element 950.

Figure 10:
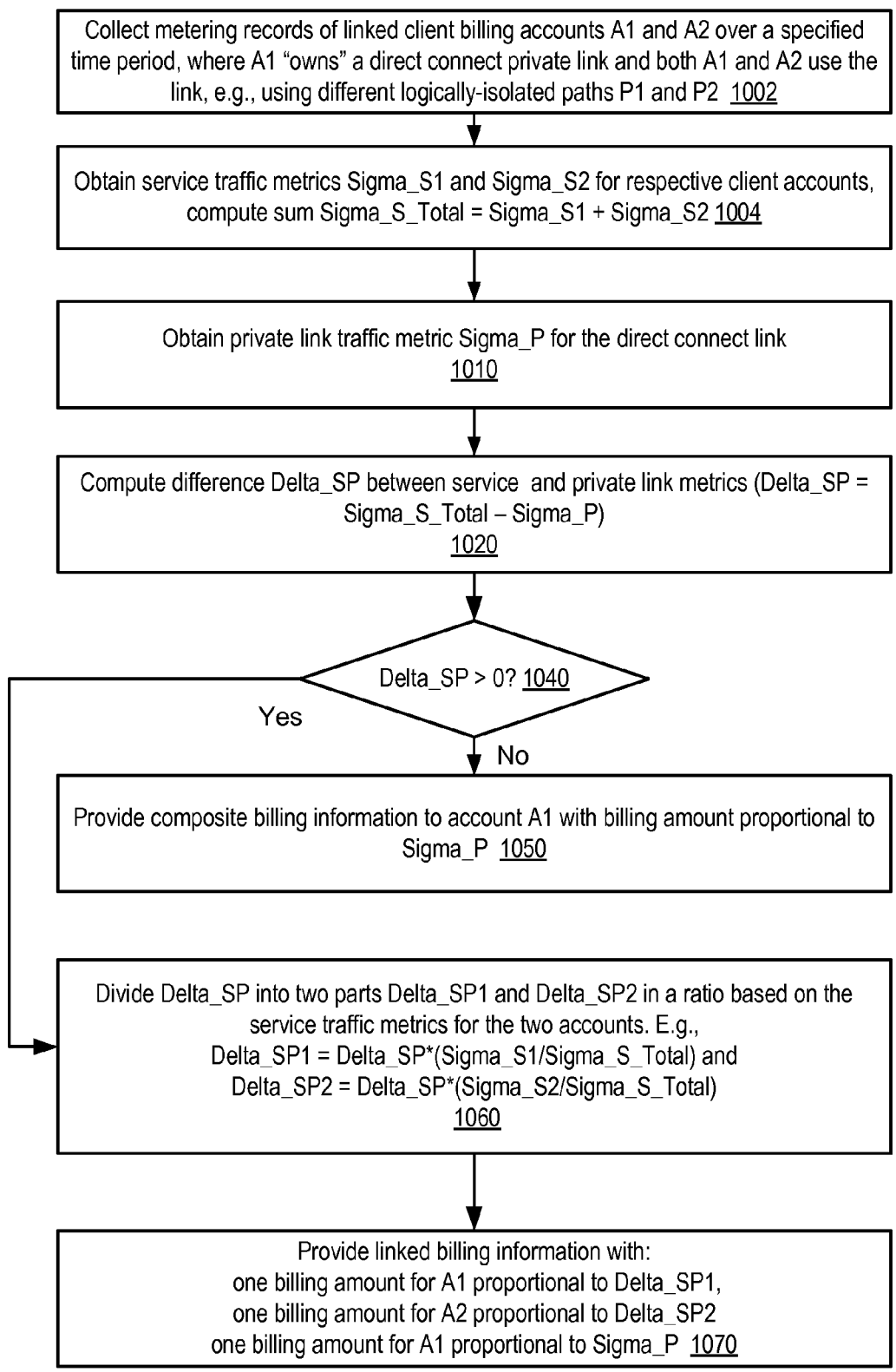
FIG. 10 is a flowchart illustrating aspects of the functionality of a billing manager in an example scenario where two customer billing accounts are linked, according to at least some embodiments.

FIG. 10 is a flowchart illustrating aspects of the functionality of a billing manager 116 in an example scenario where two customer billing accounts are linked, according to at least some embodiments. Customer A1 has established a direct connect private link 130, and traffic for both Customer A1 and Customer A2 flows over that link. In some embodiments the traffic of customer A1 may flow over one logically-isolated network path using the private link, and the traffic of customer A2 may flow over a second logically-isolated network path that uses the same private link. The billing accounts of customers A1 and A2 are linked.

The billing manager 116 may collect metering records for service-related and link-related traffic for both clients (element 1002 of FIG. 10). Metric Sigma_S1 that sums up the service-related traffic for client A1, and Sigma_S2 that sums up the service-related traffic for client A2, may be obtained (element 1004) and summed as Sigma_S_total. In addition, the summed private link traffic metric Sigma_P may also be obtained by the billing manager (element 1010). The difference Delta_SP between the sum of the service traffic metrics Sigma_S_total and the private link traffic metric Sigma_P may then be computed (element 1020).

If Delta_SP is greater than zero (as determined in element 1040), i.e., if the sum of the service-related traffic metrics for the two clients exceeds the link-related traffic metric, in the embodiment illustrated in FIG. 10 the billing manager 116 may apportion or distribute the excess service-related traffic between the two accounts in the ratio of their respective service traffic metrics. That is, as shown in element 1060, Delta_SP may be divided into two parts: Delta_SP1 computed as Delta_SP*Sigma_S1/Sigma_S_total, and Delta_SP2 computed as Delta_SP*Sigma_S2/Sigma_S_total. The billing manager may then generate consolidated billing information for the linked client accounts comprising three billing amounts (element 1070). One amount may be proportional to the private link traffic metric Sigma_P, and may be associated with A1's account. A second amount may be proportional to Delta_SP1, and also associated with A1's account, while a third amount may be proportional to Delta_SP2, and may be associated with A2's account. If Delta_SP is not greater than zero, only the billing amount proportional to Sigma_P may be provided, as shown in element 1050.

In embodiments where each of the clients A1 and A2 uses a respective logically-isolated network path sharing the private link 130, and link monitoring agents 195 are configured to break down the private link traffic by for each logically-isolated connection separately, the private link billing amount may be split up into two portions as well, one for each of the logically-isolated paths. In one embodiment, where a link monitoring agent 195 may not be able to distinguish the traffic of one logically-isolated path from that of another, the billing manager 116 may use ratio-based logic to split up the private link traffic between the two logically-isolated paths. That is, Sigma_P may be split into two components Sigma_P1 and Sigma_P2, where Sigma_P1 is obtained as (Sigma_P*Sigma_S1/Sigma_S_Total), and Sigma_P2 may be obtained as (Sigma_P*Sigma_S2/Sigma_S2_Total).

Figure 11:
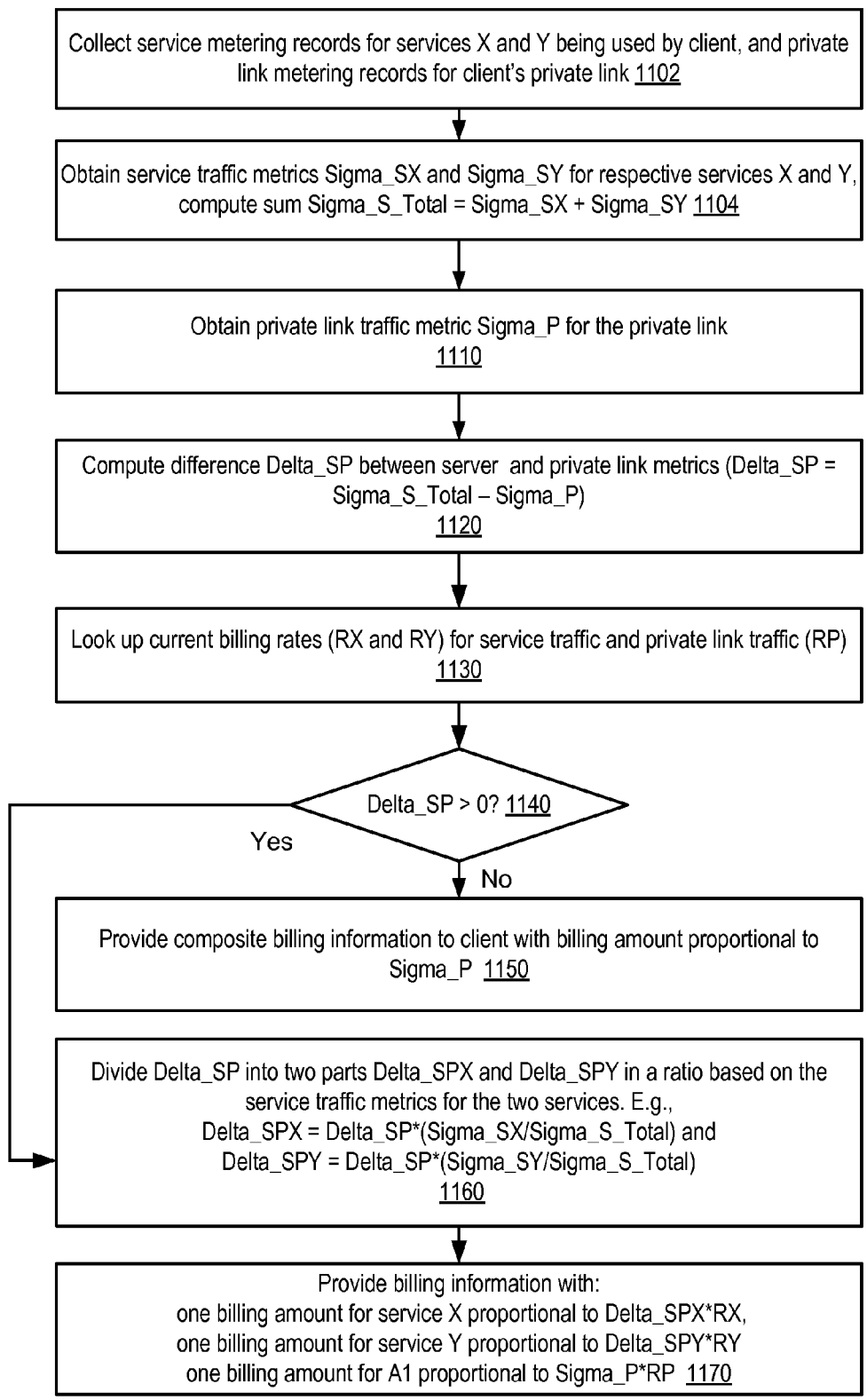
FIG. 11 is a flowchart illustrating aspects of the functionality of a billing manager in an example scenario where different billing rates are charged for each of two types of services being used by a client, according to at least some embodiments.

FIG. 11 is a flowchart illustrating aspects of the functionality of a billing manager 116 in an example scenario where different billing rates are charged for each of two types of services X and Y being used by a client, according to at least some embodiments. The billing manager 116 may collect metering records for service-related traffic for each of the services, as well as link-related traffic (element 1102 of FIG. 10) for a private link being used by the client. A total service traffic metric Sigma_S_total may be computed as the sum of the individual service traffic metrics Sigma_SX and Sigma_SY (element 1104). In addition, the summed private link traffic metric Sigma_P may also be obtained by the billing manager (element 1110). The difference Delta_SP between the sum of the service traffic metrics Sigma_S_total and the private link traffic metric Sigma_P may then be computed (element 1120). The current billing rates for each of the service types (RX and RY for services X and Y respectively) and the billing rate for the private link traffic (RP) may then be obtained (element 1130), e.g., from a billing database 119.

If Delta_SP is greater than zero (as determined in element 1140), i.e., if the sum of the service-related traffic metrics for the two services exceeds the private link-related traffic, in the embodiment illustrated in FIG. 11 the billing manager 116 may apportion or distribute the excess service-related traffic between the two service types in the ratio of their respective service traffic metrics. That is, as shown in element 1160, Delta_SP may be divided into two parts: Delta_SPX computed as Delta_SP*Sigma_SX/Sigma_S_total, and Delta_SPY computed as Delta_SP*Sigma_SY/Sigma_S_total. The billing manager may then generate billing information for the client account comprising three billing amounts (element 1170). One amount may be proportional to the private link traffic metric Sigma_P and the private link billing rate RP. A second amount may be proportional to Delta_SPX and RX, and a third amount may be proportional to Delta_SPY and RY. If Delta_SP is not greater than zero, only the billing amount proportional to Sigma_P may be provided, as shown in element 1150.

In embodiments where each of the services X and Y are provided using a respective logically-isolated network path sharing the private link 130, and link monitoring agents 195 are configured to break down the private link traffic by for each logically-isolated connection separately, the private link billing amount may be split up into two portions as well, one for each of the logically-isolated paths. In one embodiment, where a link monitoring agent 195 may not be able to distinguish the traffic of one logically-isolated path from that of another, the billing manager 116 may use similar ratio-based logic as described above to split up the private link traffic between the two logically-isolated paths. That is, Sigma_P may be split into two components Sigma_PX and Sigma_PY, where Sigma_PX is obtained as (Sigma_P*Sigma_SX/Sigma_S_Total), and Sigma_PY may be obtained as (Sigma_P*Sigma_SY/Sigma_S2_Total).

The various techniques used by billing manager in the examples described above to apportion summed traffic metrics for private links and for services may be combined as needed in different embodiments, based on the billing policies in place for a given client. In scenarios where different services have different billing rates for different clients over different time periods, the billing manager may have to perform ratio-based computations for each of the different time periods and each of the different clients and services. Despite the complexity of collecting hundreds or thousands of metrics from various agents for various clients, using a combination of the techniques described above the billing manager may be able to meet its goals of charging for network traffic on a fair and equitable basis, and avoiding over-charging any client or charging a client multiple times for the same traffic.

Example of Web-Based Interface for Billing Information

Figure 12:
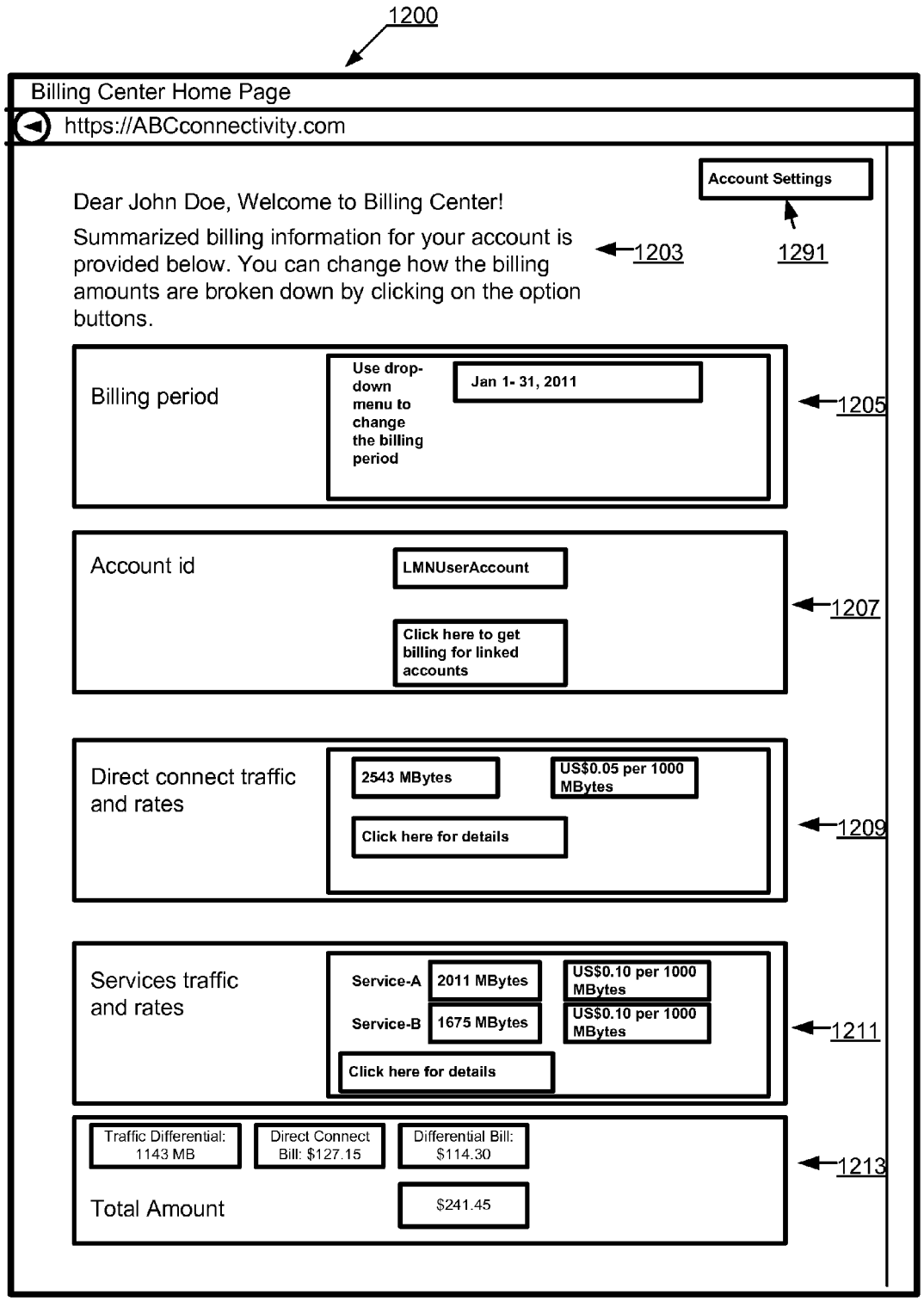
FIG. 12 is an illustration of a portion of an exemplary web-based interface that may be provided by a billing manager in some embodiments.

FIG. 12 is an illustration of a portion of an exemplary web-based interface that may be provided by a billing manager 116 in some embodiments. For example, a client of the provider network may log in to a web site operated by billing manager 116 to view billing information associated with the client's billing accounts. In area 1203 of web page 1200, a friendly greeting and overview message may be provided. A billing period may be indicated in an area 1205, and in some embodiments the client may be allowed to select a billing period from a set of choices for billing periods, or specify the billing period, for which data is to be shown on the web page. The billing account identifier of the client may be displayed in area 1207, and the client may be given the option of switching to a view where consolidated billing information for linked accounts may be specified, e.g., via a button labeled "Click here to get billing for linked accounts".

Area 1209 may be provided to indicate the charges related to direct connect private links—e.g., the total amount of direct connect traffic and the applicable rate may be shown. Area 1211 may show the service-related billing information. In each case the client may be allowed to obtain a more detailed view of the summarized data, e.g., broken down at finer time granularity, by logically-isolated paths, or based on other criteria. Finally, a total amount for the billing period may be shown in an area 1213 in the illustrated embodiment. The total amount may be divided into subcomponents indicating the contribution of the direct connect traffic and the service-related "differential" or "excess" traffic as shown. In one embodiment a button 1291 may be provided to allow the client to change settings, e.g., to request changes in the layout of the web page or to request billing policy changes.

Dynamic Bandwidth Management Using Routing Signals

When setting up their data centers and networks, and allocating resource collections and network paths to clients, provider network operators often install spare capacity. For example, even if a client needs no more than 500 megabits/second of bandwidth, the provider network operator may set up gigabit/second (or even ten gigabit/second) network paths. This may be done for a variety of reasons: to ensure that spikes in customer demand can be handled, for example, or in anticipation of increased future steady-state demand, or because standard equipment (such as networking cables) may have a capacity that does not always match the exact client needs. Clients may also sometimes request that more resources (e.g., more or faster CPUs, memory or bandwidth) be allocated for them than they know they will consistently need, even in computing environments where they may be able to add resources fairly quickly. As a result, even in provider networks that support dynamic bring-up of resources, there may be underused resources from time to time. In one embodiment, as also described briefly earlier, a dynamic bandwidth management mechanism may be employed to inform clients about currently available bandwidth levels via routing signals.

Figure 13:
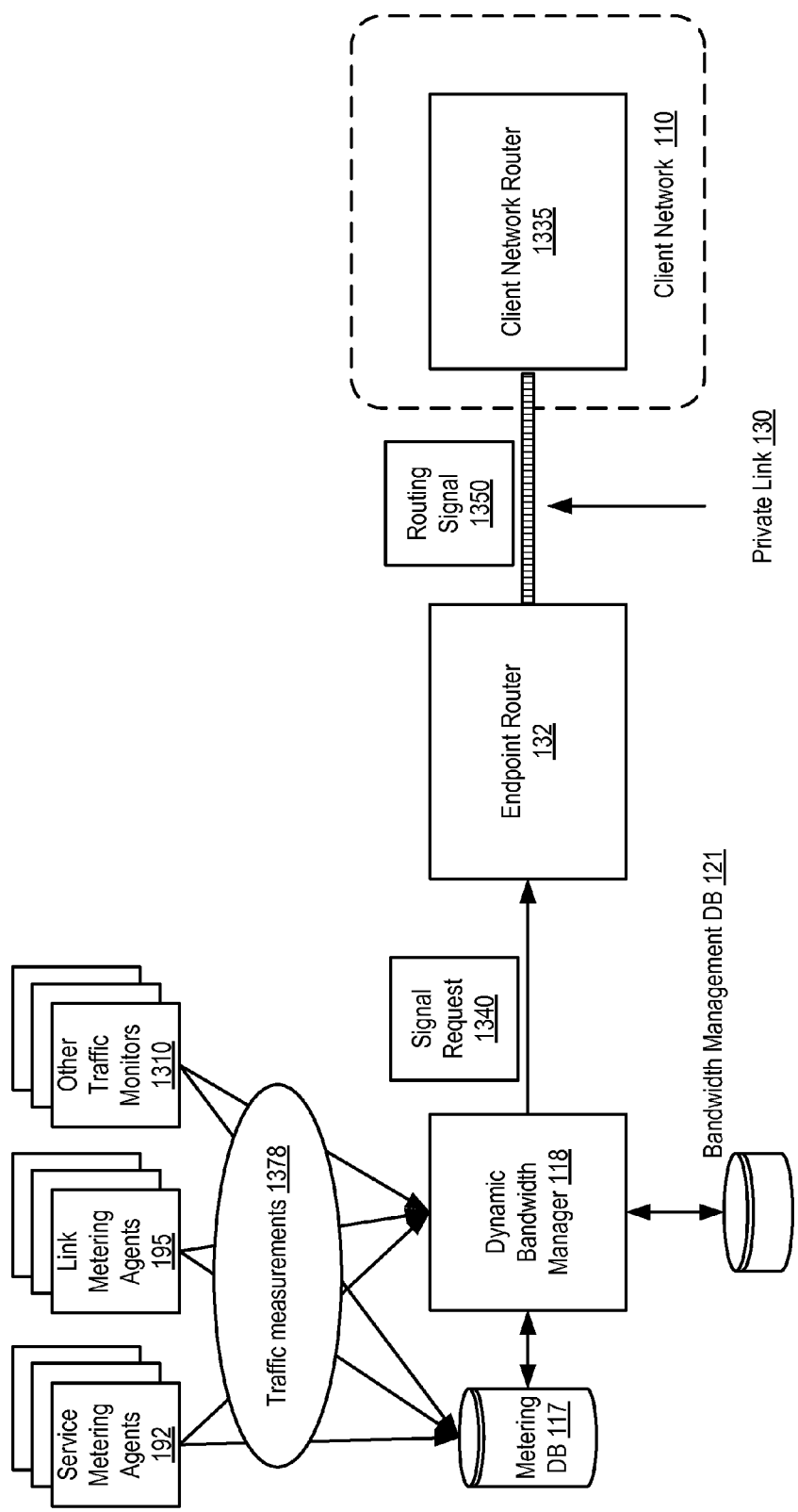
FIG. 13 illustrates aspects of the operation of a dynamic bandwidth manager, according to at least some embodiments.

FIG. 13 illustrates aspects of the operation of a dynamic bandwidth manager (DBM) 118, according to at least some embodiments. A DBM 118 may be configured to obtain network traffic measurements from a variety of sources. For example, service metering agents 192 may gather network traffic data at various service instances of a provider network, in a manner similar to that discussed above in conjunction with the description of FIGS. 4a and 4b. Link metering agents 195 may gather traffic data for various private links 130 set up between a client network 110 and the provider network. Other traffic monitors 1310 may also collect network traffic measurements at various points in the provider network in one embodiment, e.g., at various internal network devices, servers, and links connecting the endpoint routers 132 to the resource collections where service instances are implemented for the client. Some or all of these sources of traffic data may send their metering records and measurements directly to the DBM 118 in some embodiments, while in other embodiments the data may be stored in a metering database 117 which the DBM 118 may consult as needed. In addition to obtaining current or recent traffic data, in some embodiments the DBM may also have access to the client's settings for dynamic bandwidth management—e.g., the baseline or currently-agreed-to bandwidth level allocated to the client, the maximum price the client is currently willing to pay, and so on. Such settings may be stored in a dynamic bandwidth management database 121 in some embodiments.

Based on its knowledge of the client's bandwidth management settings, and its knowledge of the measured traffic transmission rates, the DBM 118 may determine whether to inform the client that additional bandwidth is available. In one embodiment, the DBM 118 may be operable to determine whether a difference Delta_MP between a measured transmission rate of traffic over at least a portion of a network path linking the client network 110 to one or more resource collections 140 allocated to the client, and a peak transmission capacity of the network path, exceeds a threshold value T1. If the difference Delta_MP exceeds T1, the DBM 118 may initiate a transmission of a routing signal 1350 to the client network 110 indicating that more bandwidth is available (i.e., bandwidth exceeding the current baseline allocated to the client is available). In some embodiments the DBM 118 may send a signal request 1340 to an endpoint router 132, indicating the nature of the routing signal the endpoint router should send. In other embodiments, a signal request may be sent to any network device of the provider network that may be capable of sending a routing signal 1350 to the client network 110, such as other routers, intelligent gateways, intelligent switches, and the like. In one embodiment the DBM 112 itself may be incorporated within a device capable of sending routing signals 1350, in which case the DBM itself may transmit the routing signal 1350. The portion of the network path where the transmission rate is measured may include one or more direct connect links in some embodiments, and may exclude direct connect links in other embodiments.

The routing signal 1350 may comprise, in one embodiment, one or more messages formatted in accordance with a routing protocol such as the Border Gateway Protocol (BGP) or any other appropriate routing protocol. In one implementation in which BGP is used, a particular value or range of values of a BGP attribute such as the Multi-exit discriminator (MED) attribute or a community attribute (which may also be referred to as a communities attribute) may be used to indicate the availability of excess bandwidth. In some embodiments the Open Shortest Path First (OSPF) protocol may be used, and in other embodiments the Resource Reservation Protocol (RSVP) may be used.

In other embodiments the routing signal may comprise a set of advertised routing prefixes or addresses. For example, a BGP advertisement, indicating that packets targeted at address range 156.10.1.0/24 (expressed in Common Internet Domain Routing or CIDR notation) should be directed towards a particular resource collection, may have been initially propagated from some set of routers such as endpoint router 132 and/or other routers of the provider network. (In this example, the notation 156.10.1.0/24 is interpreted as follows: the 156.10.1.0 indicates the starting address of a range of IP addresses; and the 24 specifies the decimal number of the leading bits of the routing prefix for that range. In this case the 24 leading bits imply that, in the range of IP addresses being advertised, the first three dot-separated digits are to remain constant—156, 10, and 1 in this case, each accounting for 8 of the 24 bits. This leaves a range of 256 addresses covered by the range—156.10.1.0 through 156.10.1.255.) By advertising additional addresses, say in the range 156.10.2.0/24 (i.e., 156.10.2.0 through 156.10.2.255), 256 more addresses may be added to the set of addresses usable for the resource collections of the client, which may serve as an indication of additional available bandwidth. Other types of routing signals may be used in some embodiments.

The routing signal 1350 may be sent to a client network router 1335 as shown. Depending on the type of the routing signal used, the signal may be propagated to various other network devices—for example, routing prefixes may be sent on to other client network routers or even routers beyond the client network. In some embodiments the receipt of the routing signal 1350 at one or more networking devices in the client network 110 may result in changes in client application behavior—e.g., more instances of an application or application component may be started up, the number of processing threads involved in a computation may be increased, and so on. In one embodiment, a reception of a routing signal at a client network device may in turn trigger messages or notifications being sent to other client devices or to client applications that indicate the change in available bandwidth, so that the targeted client applications or devices may perform operations to take advantage of the additional bandwidth. In some implementations the routing signal may specify not just the fact that additional bandwidth is available, but how much additional bandwidth is available.

In one embodiment the DBM 118 may also be responsible for providing indications of pricing changes that may be made in accordance with the changing bandwidth utilization. For example, the configuration settings for a client may include the currently acceptable maximum price the client is willing to pay for network usage. If a DBM 118 determines that there is sufficient spare bandwidth available (e.g., if the difference Delta_MP discussed above exceeds some pricing-related threshold T2), the DBM 118 may be willing to offer the bandwidth at a lower price than the client is currently paying. In such an embodiment, the DBM 118 may also send a transmission of pricing information associated with the available transmission rate to the client. In some implementations, the DBM may initiate the sending of the pricing information, and the information may actually be sent by some other entity such as a billing manager 116. A client may thus be notified not only about the bandwidth available in such embodiments, but also about a price associated with using the bandwidth, so that a cost-benefit analysis of using the newly-available bandwidth is made easier. In some embodiments the DBM 118 may be configured to change the pricing information offered to a client based on the current network utilization levels—e.g., if there is 1000 megabits/sec of spare capacity, one price may be offered, and if there is 10000 megabits/sec of spare capacity, the price may be lowered further. Thus the magnitude of Delta_MP may play a role in determining the pricing in such an embodiment. In one embodiment, the threshold T2 that may be used to make dynamic pricing modifications may itself be a function of Delta_MP—e.g., the threshold may be reduced as Delta_MP increases. In various embodiments, the frequency at which DBM 118 makes decisions as to whether to send routing signals and/or pricing information to clients may differ, i.e., the time intervals between such decisions may vary, based for example on factors such as how quickly bandwidth measurements happen to be changing, how frequently bandwidth measurements are received from various metering agents, the preferences of the clients, and so on.

In one embodiment a DBM 118 may be configured to provide signals or indications of a possible need to reduce network usage by clients. For example, in one scenario a DBM 118 may have previously signaled to a client A1 that additional bandwidth is available. The client A1 may as a result have increased its network usage, e.g., by starting up more threads of a network-intensive application. Over time, other traffic may also have increased over portions of the provider network and/or the physical link set up for A1. Consequently, when DBM 118 performs one of its subsequent computations to determine Delta_MP on behalf of the client A1, it may find that Delta_MP has fallen to less than a second threshold T2, indicating that the network path utilization may now be reaching higher than desired levels. In such a situation, the DBM 118 may send an indication of a reduction in available bandwidth to the client, or initiate the transmission of such an indication. In one implementation, the indication may comprise another routing signal, e.g., a BGP message with a particular attribute setting different than the setting used to indicate additional bandwidth availability. In another implementation, the indication may comprise dropping packets received from the client. If a protocol such as the Transmission Control Protocol (TCP) is being used, the dropping of packets received from the client may result in adjustments or reductions in subsequent transmission rates from the client, because of the flow control functionality built in to the protocol. A withdrawal of one or more networking prefixes or routes may be used in some embodiments to signal that client traffic should be reduced.

Client-Provided Dynamic Bandwidth Configuration Settings

Figure 14:
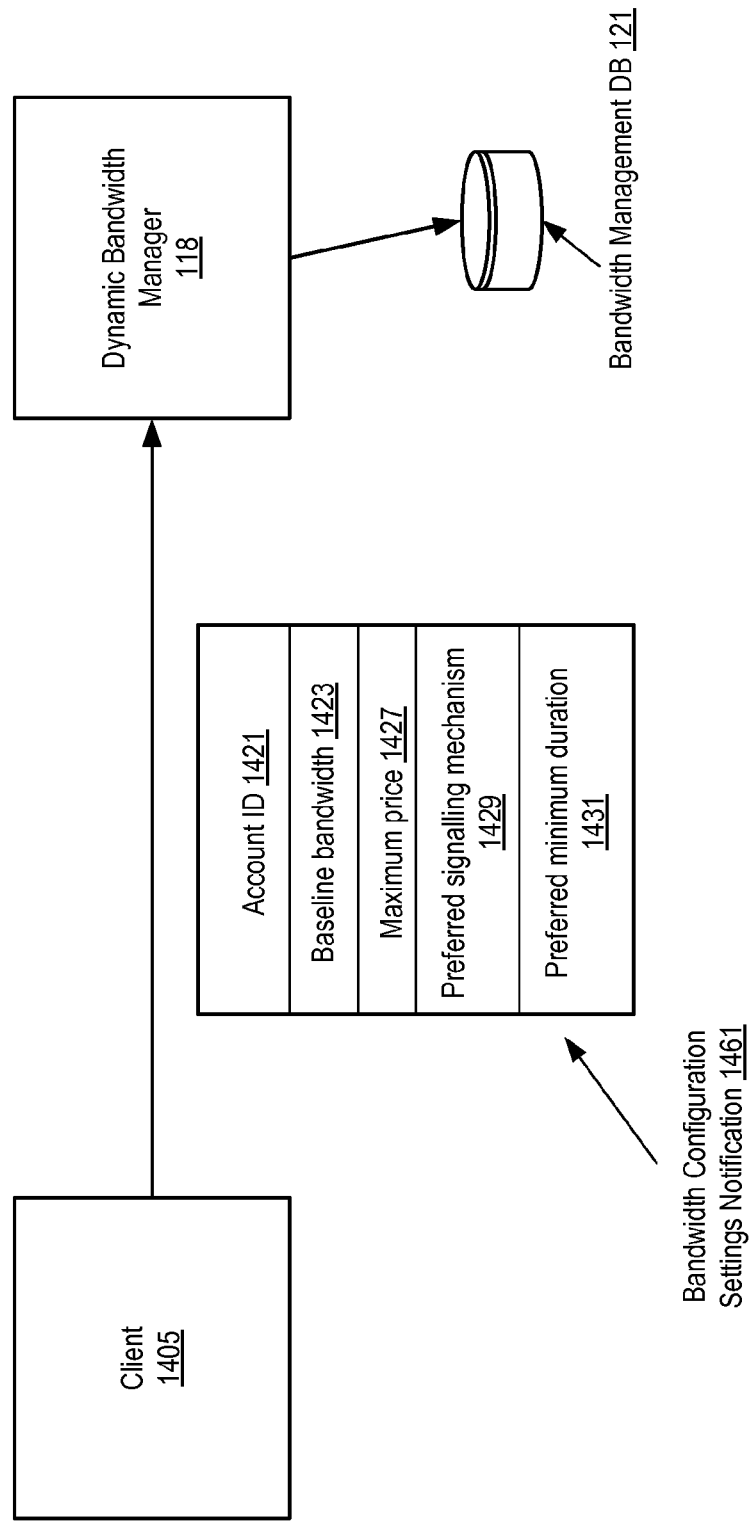
FIG. 14 illustrates an example of constituent elements of a bandwidth configuration settings notification that may be sent on behalf of a client to a dynamic bandwidth manager, according to at least some embodiments.

FIG. 14 illustrates an example of constituent elements of a bandwidth configuration settings notification 1461 that may be sent on behalf of a client 1405 to a dynamic bandwidth manager 118, according to at least some embodiments. Such a notification may be sent to the DBM 118 at various points in time in some embodiments: e.g., when a client sets up an account with the provider network as discussed with reference to element 201 of FIG. 2, or when a client receives a signal indicative of a change (increase or decrease) in available bandwidth, or when a client wishes to modify its bandwidth preferences on its own accord, e.g., based on changes in the client application workload. The DBM 118 may save the settings in a dynamic bandwidth management database 121 in some embodiments.

As shown, the settings notification 1461 may comprise an identifier 1421 of the client's account, and an indication of the baseline bandwidth 1423 that the client is willing to pay for, or has contractually agreed to pay for. In some embodiments the settings notification 1461 may include a maximum price 1427 that the client is currently willing to pay for network bandwidth, i.e., at the time the settings notification is transmitted. In one embodiment the client may indicate a preferred signaling mechanism 1429 for bandwidth modification signals—e.g., the client may prefer that the BGP communities attribute be used to indicate that excess bandwidth is available, or that routing prefixes should be used. In some embodiments a client may also wish to indicate a preferred minimum duration 1431 for a bandwidth modification. For example, a network-intensive application such as a climate simulation or a bioinformatics computation being run by the client may require that for a minimum amount of useful work to be done, a large data set that may take fifteen minutes to transfer over the network is needed. In such a scenario, while the client may be willing to make use of additional bandwidth to perform more computations, it may indicate a preference that the additional bandwidth, once provided to the client, remain available for at least fifteen minutes. Such a preference may be indicated using a preferred minimum duration field 1431 in the settings notification. In one such embodiment the DBM 118 may, upon receiving such a duration preference, consult measurement metrics trends that it may maintain, e.g., within dynamic bandwidth management database 121, to estimate the probability that extra bandwidth will remain available to the client for the desired duration before making a decision whether to send a signal indicative of the extra bandwidth to the client. Additional settings, not shown in FIG. 14, such as preferences for times of the day (or days of the week) during which extra bandwidth could be used most effectively by the client, may also be communicated to DBM 118 as needed from time to time in some embodiments.

Methods for Remote Connectivity Operations

Figure 15:
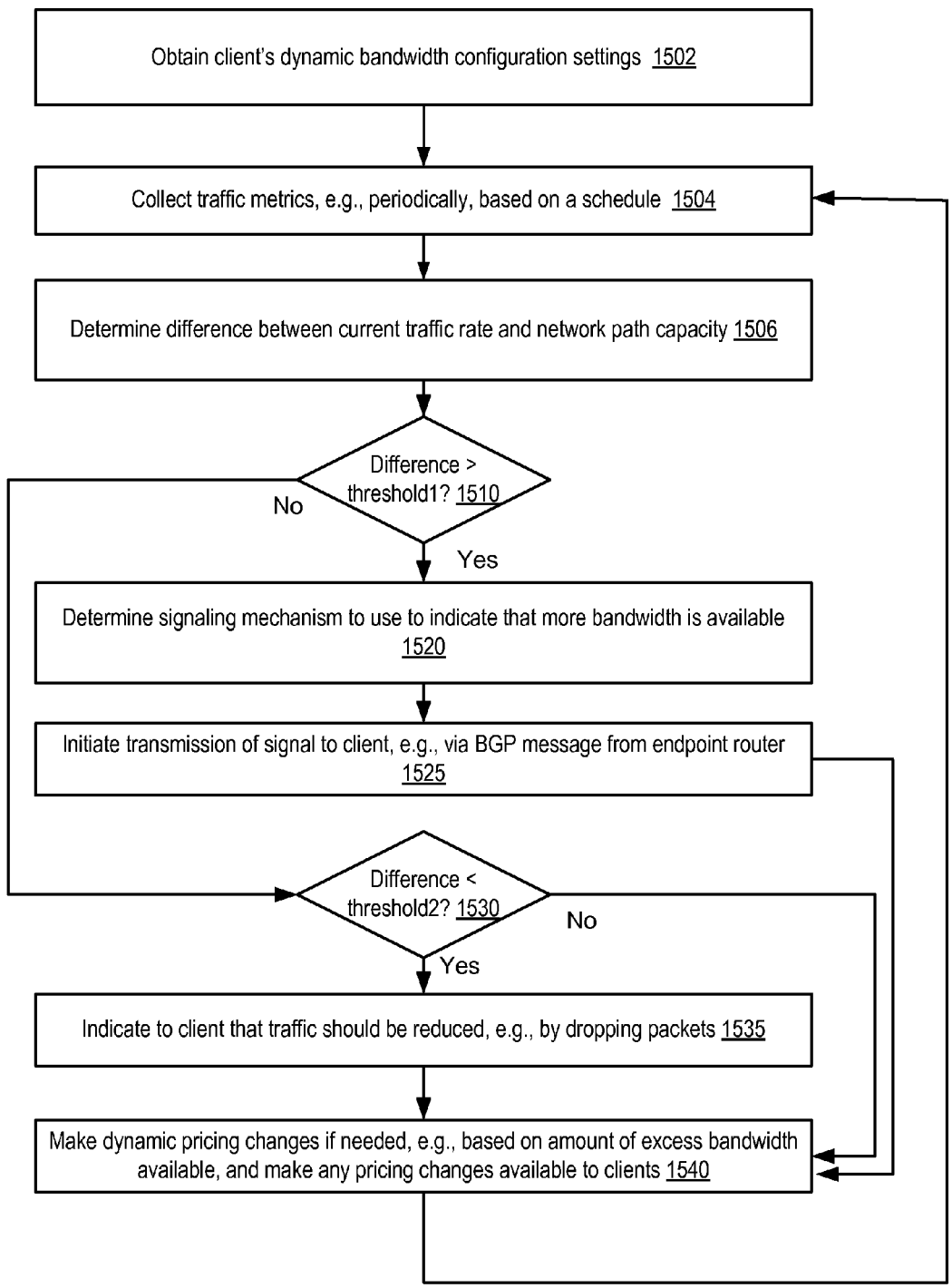
FIG. 15 is a flowchart of a method for dynamic bandwidth management in provider networks that support the establishment of direct private links with client networks, according to at least some embodiments.

FIG. 15 is a flowchart of a method for dynamic bandwidth management in provider networks that support the establishment of private links 130 with client networks 110, according to at least some embodiments. The method (as shown in element 1502 of FIG. 15) comprises receiving a client's dynamic bandwidth configuration settings, including for example a baseline transmission rate of the client's network traffic expected or allowed on one or more paths between the client's network and resource collections within a provider network. The settings may be obtained by a dynamic bandwidth manager 118, and may be stored within a dynamic bandwidth database 121 in some embodiments. In one embodiment, an initial set of bandwidth configuration settings, some or all of which may have default values, may be established when a client sets up a client account, and the client may be given the opportunity to change some or all of the settings at any desired intervals thereafter. In addition to the baseline transmission rate, the settings may include other parameters such as a maximum currently acceptable price, preferences for signaling mechanisms to be used to indicate changing bandwidth availability, and so on, as discussed in the description of FIG. 14.

As shown in element 1504 of FIG. 15, the method may in one embodiment further comprise collecting network traffic metrics, e.g., with the help of link metering agents 195, service metering agents 192, and any other traffic monitors that may be configured to measure traffic flowing through various links and devices between the client network 110 and the resource collections 140 to which the client network is connected. Traffic measurements may be taken in accordance with a schedule in some embodiments, e.g., measurements collected over five-minute intervals may be provided to the dynamic bandwidth manager 118 and/or stored in a metering database 117. The difference between the peak transmission capacity of a network path between a client network and the client's resource collections, and the measured traffic over at least a portion of the network path, may be obtained, as shown in element 1506 of FIG. 15. If the difference exceeds a first threshold, as determined in element 1510, a decision may be made to indicate to the client that additional bandwidth is available. A signaling mechanism to be used for communicating this information to the client may be selected (element 1520) in some embodiments, e.g., based on the client's preference settings or on an agreement reached beforehand with the client. A transmission of a routing signal indicating an available transmission rate that exceeds the baseline transmission rate of the client may be initiated by the dynamic bandwidth manager 118 (element 1525), e.g., in the form of one or more messages formatted in accordance with a routing protocol such as BGP from a router connected to the client network in some embodiments.

In one embodiment, if the difference between the peak transmission capacity and the measured traffic rates is found to be less than a second threshold (as determined in element 1530 of FIG. 15), a dynamic bandwidth manager 118 may initiate a transmission of an indication to the client that the client's traffic transmission rate should be reduced (element 1535). Such an indication may for example comprise dropping one or more network packets received from the client, sending routing protocol messages, and/or changing routing prefixes. The client may reduce its subsequent traffic in response to the indication—for example, in the case where packets are dropped, the software for a network protocol such as TCP that implements flow control may adjust the transmission rate downwards. If the difference between the peak transmission capacity and the measured traffic rates lies within an acceptable range (i.e., if it neither exceeds the first threshold nor is less than the second threshold), no signal or indication of bandwidth changes may be sent to the client until the next time the difference is computed.

In one embodiment, a dynamic bandwidth manager 118 may also be configured to make bandwidth pricing changes—e.g., to reduce the price during periods when there is substantial excess bandwidth available, and to increase the price as the available bandwidth decreases. Such changes may be made and communicated to the client (element 1540 of FIG. 15) as needed. In some embodiments routing signals (e.g., BGP messages with certain attribute values) may be used for communicating price changes, while in other embodiments other means of communication may be used, such as an updated price made available via a web page or pages.

Figure 16:
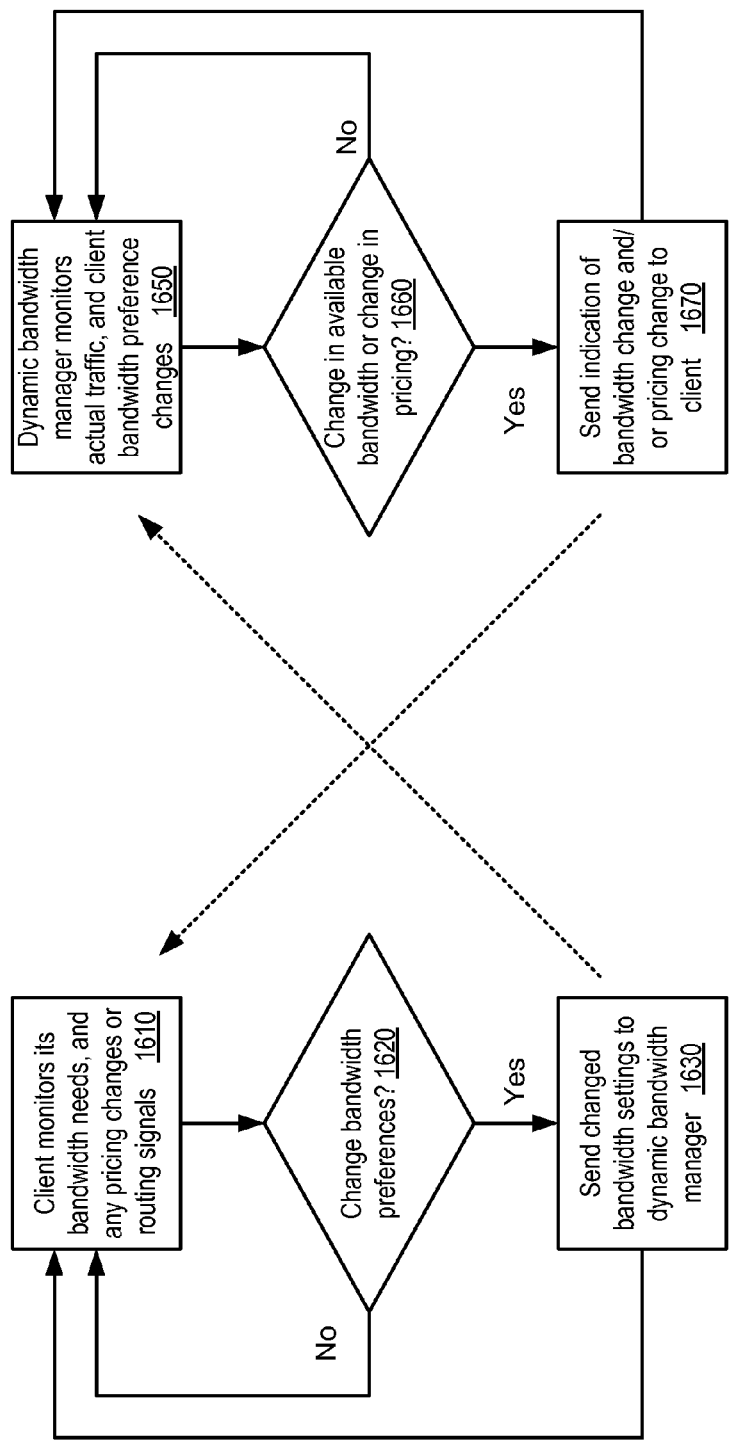
FIG. 16 is a flowchart illustrating interactions between a client and a dynamic bandwidth manager in a scenario where modified bandwidth availability information may result in a change in a client's configuration settings, according to at least some embodiments.

FIG. 16 is a flowchart illustrating interactions between a client and a dynamic bandwidth manager in a scenario where modified bandwidth availability information may result in a change in a client's configuration settings, according to at least some embodiments. As shown in element 1610, a client that may have established private connectivity to a provider network using one or more direct connect links 130 may monitor its bandwidth needs over time, and may also monitor indications of the availability and pricing of bandwidth provided to it by a dynamic bandwidth manager 118. If the client's bandwidth needs change, and/or if new pricing or availability information received from the DBM 118 makes a change in the client's bandwidth use desirable (as determined in element 1620), the client may transmit a change in its bandwidth configuration settings to the DBM 118 (element 1630). The change may for example indicate that the client desires to increase or reduce its currently-configured baseline transmission rate, or to change the maximum price it is willing to pay for network transmission.

Concurrently, the DBM 118 may monitor actual traffic at various points in the network (e.g., with the help of link metering agents 195, service metering agents 192, and/or other traffic monitors), as well as any configuration preference changes communicated by the client (element 1650). If, based on its knowledge of the peak bandwidth capabilities of network paths, the difference between the peak and the measured transmission rates, and/or the client's configuration settings, the DBM 118 makes a determination that a client should be notified about a change in the available bandwidth or pricing (element 1660), the DBM may send an indication of the bandwidth change and/or pricing change to the client (element 1670). For example, a change in available bandwidth may be indicated using a message formatted according to a routing protocol in use, such as BGP, OSPF, or RSVP. The dotted lines between the left and right portions of FIG. 16 are intended to indicate the impact of the client's actions on the DBM 118, and the DBM's actions on the client. For example, the client's sending a notification of a change in its configuration settings may trigger the DBM to check whether the new settings and the current traffic measurements warrant an initiation of a routing signal or pricing notification; and the transmission of a routing signal from the DBM indicating a change in available bandwidth may trigger the client to check whether a change in the client's settings (such as an acceptable price or the baseline transmission level) is desirable.

Example Web Interface for Dynamic Bandwidth Interactions

Figure 17:
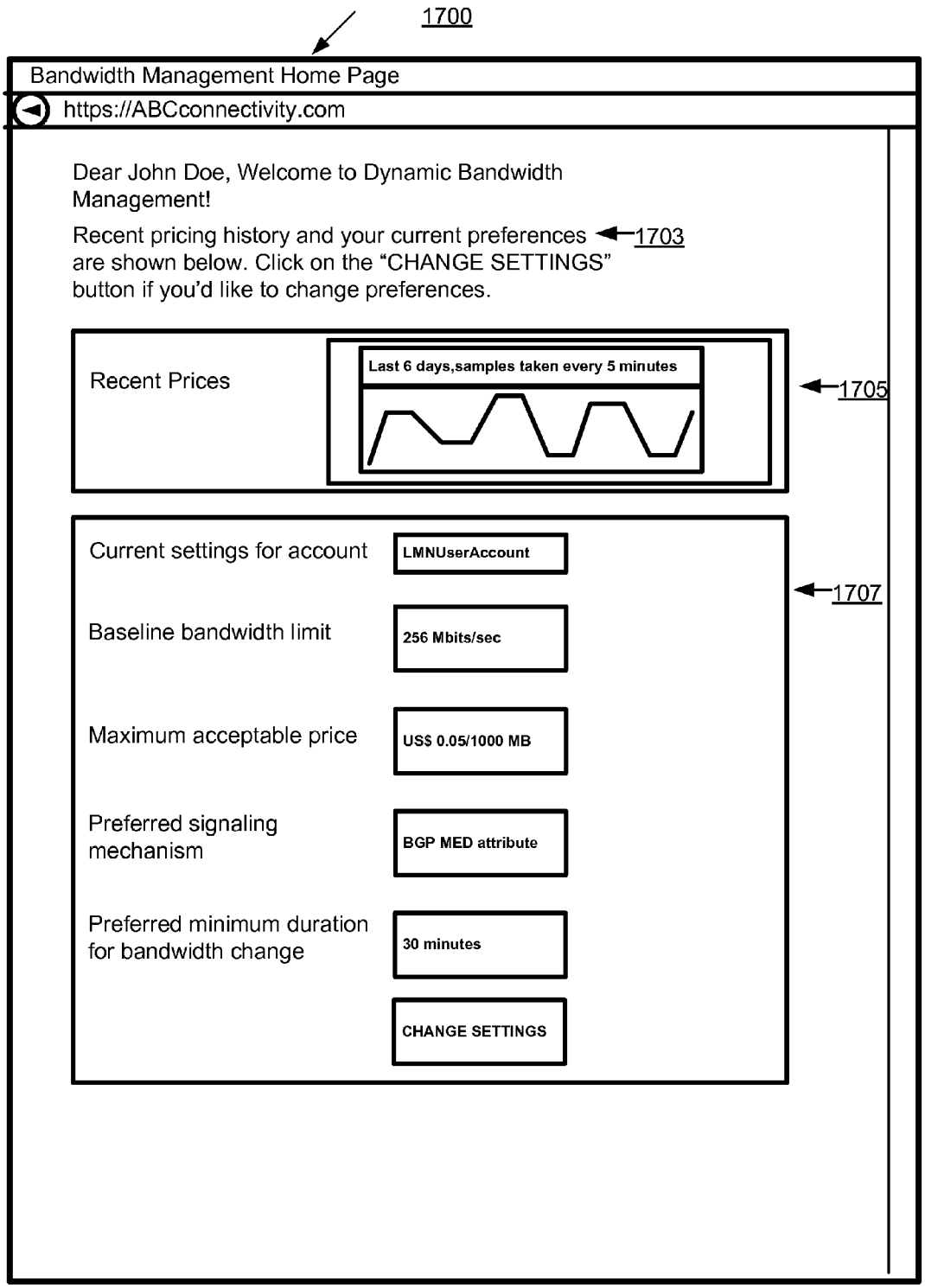
FIG. 17 is an illustration of a portion of an exemplary web-based interface that may be provided for dynamic bandwidth-related communications, according to some embodiments.

In some embodiments the DBM 118 may be configured to implement one or more programmatic interfaces to communicate with the client regarding some of the functionality described above. For example, one or more application programming interfaces (APIs), command-line interfaces, graphical user interfaces (GUIs), and/or web interfaces may be implemented. FIG. 17 is an illustration of a portion of an exemplary web-based interface that may be provided for dynamic bandwidth-related communications, according to some embodiments. Web page 1700 may be used, for example, to provide bandwidth pricing history to clients, which may be helpful in their decisions on whether to utilize surplus bandwidth in the future. Such a web page may also allow clients to inspect their current dynamic bandwidth settings and initiate changes to the settings as desired.

As shown, the web page 1700 may comprise a greeting area 1703 welcoming the client. A graphical representation 1705 of pricing history over a recent period may be provided in some embodiments. The client may be allowed to change the time period for which pricing history is displayed in some implementations, e.g., by selecting among choices such as "Last 24 hours", "Last week", "Last month" and so on. The graphical display may itself be updated in real time with the latest pricing information available in one implementation. The current bandwidth-related configuration settings of the client may be displayed in region 1707. Such a region may include the client's billing account identification and a baseline bandwidth setting currently in effect for the client. In some embodiments the current settings for the maximum price the client is willing to pay may be included in the web page. In one embodiment a preferred signaling mechanism to be used to notify the client of changes to available bandwidth may also be included in the displayed settings. The client may be permitted to request that the settings be changed, e.g., by using a "Change Settings" button as shown. In some embodiments the client may be allowed to change values for various settings within a region 1707, and the "Change Settings" button may lead to a confirmation page where the new settings are displayed and the client is requested to verify them before they are put into effect.

Example Use Cases

The techniques described above of providing differential metering and billing for direct connect links, and of dynamic bandwidth management, may be used in a variety of environments. For example, an operator of a provider network that is investing in the provision of dedicated direct connect links 130 may wish to increase the market penetration of the direct connect functionality and retain a high level of customer satisfaction from direct connect clients. In order to do so, the rates charged for direct connect data transmission may be set lower than the default rates charged for service-related data transmission in some embodiments, and direct connect clients may be informed that they will be charged at the (lower) direct connect rates for as much traffic as flows over the direct connect links, without being charged again for that same traffic at service-related rates at their resource collections. The functionality of providing consolidated billing for linked accounts, drill-down capabilities for getting billing details for different types of traffic, and billing at the level of logically-isolated paths may all help to make billing easier to manage and understand for customers. The ability of dynamic bandwidth managers to use routing signals to indicate changes in available bandwidth, and to use dynamically-modifiable client preferences in making pricing and bandwidth allocation decisions, may be very helpful for clients whose applications require large and/or varying amounts of network data transfer.

Illustrative Computer System

Figure 18:
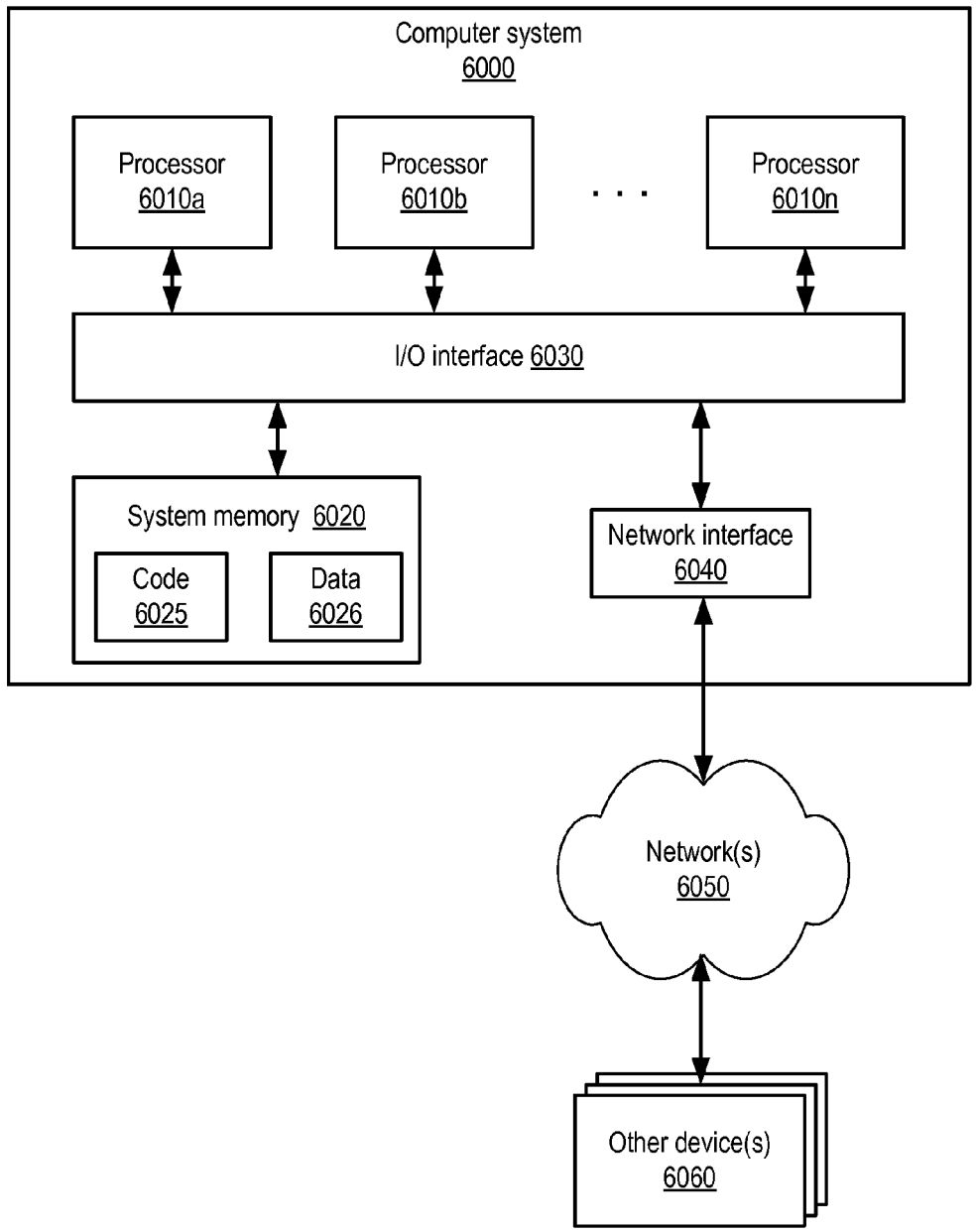
FIG. 18 is a block diagram illustrating an example computer system that may be used in some embodiments.

In at least some embodiments, a server that implements a portion or all of one or more of the technologies described herein, including the techniques to implement an interface that defines various connectivity services and operations, and to receive and respond to various types of connectivity requests via the interface, may include a general-purpose computer system that includes or is configured to access one or more computer-accessible media, such as computer system 6000 illustrated in FIG. 18. In the illustrated embodiment, computer system 6000 includes one or more processors 6010 coupled to a system memory 6020 via an input/output (I/O) interface 6030. Computer system 6000 further includes a network interface 6040 coupled to I/O interface 6030.

In various embodiments, computer system 6000 may be a uniprocessor system including one processor 6010, or a multiprocessor system including several processors 6010 (e.g., two, four, eight, or another suitable number). Processors 6010 may be any suitable processors capable of executing instructions. For example, in various embodiments, processors 6010 may be general-purpose or embedded processors implementing any of a variety of instruction set architectures (ISAs), such as the x86, PowerPC, SPARC, or MIPS ISAs, or any other suitable ISA. In multiprocessor systems, each of processors 6010 may commonly, but not necessarily, implement the same ISA.

System memory 6020 may be configured to store instructions and data accessible by processor(s) 6010. In various embodiments, system memory 6020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 6020 as code 6025 and data 6026.

In one embodiment, I/O interface 6030 may be configured to coordinate I/O traffic between processor 6010, system memory 6020, and any peripheral devices in the device, including network interface 6040 or other peripheral interfaces. In some embodiments, I/O interface 6030 may perform any necessary protocol, timing or other data transformations to convert data signals from one component (e.g., system memory 6020) into a format suitable for use by another component (e.g., processor 6010). In some embodiments, I/O interface 6030 may include support for devices attached through various types of peripheral buses, such as a variant of the Peripheral Component Interconnect (PCI) bus standard or the Universal Serial Bus (USB) standard, for example. In some embodiments, the function of I/O interface 6030 may be split into two or more separate components, such as a north bridge and a south bridge, for example. Also, in some embodiments some or all of the functionality of I/O interface 6030, such as an interface to system memory 6020, may be incorporated directly into processor 6010.

Network interface 6040 may be configured to allow data to be exchanged between computer system 6000 and other devices 6060 attached to a network or networks 6050, such as other computer systems or devices as illustrated in FIGS. 1 through 17, for example. In various embodiments, network interface 6040 may support communication via any suitable wired or wireless general data networks, such as types of Ethernet network, for example. Additionally, network interface 6040 may support communication via telecommunications/telephony networks such as analog voice networks or digital fiber communications networks, via storage area networks such as Fibre Channel SANs, or via any other suitable type of network and/or protocol.

In some embodiments, system memory 6020 may be one embodiment of a computer-accessible medium configured to store program instructions and data as described above for FIGS. 1 through 17 for implementing embodiments of methods and apparatus for differential bandwidth metering for networks implementing direct peerings, and for dynamic bandwidth management in such networks. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 6000 via I/O interface 6030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 6000 as system memory 6020 or another type of memory. Further, a computer-accessible medium may include transmission media or signals such as electrical, electromagnetic, or digital signals, conveyed via a communication medium such as a network and/or a wireless link, such as may be implemented via network interface 6040. Portions or all of multiple computer systems such as that illustrated in FIG. 18 may be used to implement the described functionality in various embodiments; for example, software components running on a variety of different devices and servers may collaborate to provide the functionality of the dynamic bandwidth manager and/or the billing manager. In some embodiments network devices such as intelligent switches, routers, gateways or other appliances may be used.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
 a resource collection;
 an endpoint device connected to a private link of a network path between a client network of a client and the resource collection; and
 a bandwidth manager operable to:
  receive bandwidth configuration settings associated with the client, comprising a baseline transmission rate of traffic over the network path;
  determine whether a difference between a measured transmission rate of traffic over at least a portion of the network path and a peak transmission capacity of the network path exceeds a threshold value; and
  in response to a determination that the difference exceeds the threshold value, initiate a transmission of a routing signal to the client network indicative of an available transmission rate that differs from the baseline transmission rate.

2. The system as recited in claim 1, wherein the routing signal comprises a message formatted in accordance with a routing protocol.

3. The system as recited in claim 2, wherein the routing protocol comprises the Border Gateway Protocol (BGP).

4. The system as recited in claim 1, wherein the bandwidth manager is further operable to:
 in response to the determination that the difference exceeds the threshold value, initiate a transmission of pricing information associated with the available transmission rate to the client.

5. The system as recited in claim 4, wherein the pricing information comprises a dynamic pricing component, wherein the bandwidth manager is further operable to:
 modify the dynamic pricing component based on one or more criteria, wherein one criterion of the one or more criteria comprises a magnitude of the difference between the measured transmission rate and the peak transmission capacity.

6. A method, comprising:
 receiving bandwidth configuration settings associated with a client, comprising a baseline transmission rate of traffic over a network path between a client network of the client and a resource collection;
 determining whether a difference between a measured transmission rate of traffic over at least a portion of the network path and a peak transmission capacity of the network path exceeds a threshold value; and in response to determining that the difference exceeds the threshold value, initiating a transmission of a signal to the client network indicative of an available transmission rate that differs from the baseline transmission rate.

7. The method as recited in claim 6, wherein the signal comprises a message formatted in accordance with a routing protocol.

8. The method as recited in claim 7, wherein the routing protocol comprises the Border Gateway Protocol (BGP).

9. The method as recited in claim 8, wherein the message comprises a multi-exit discriminator (MED) attribute.

10. The method as recited in claim 8, wherein the message comprises a communities attribute.

11. The method as recited in claim 7, wherein the routing protocol comprises at least one of: the Open Shortest Path First (OSPF) protocol, or the Resource Reservation Protocol (RSVP).

12. The method as recited in claim 6, wherein the signal comprises an advertisement of a routing prefix.

13. The method as recited in claim 6, further comprising:
in response to determining that the difference is less than a second threshold value, providing an indication to the client network of a reduction in available bandwidth.

14. The method as recited in claim 6, further comprising:
in response to determining that the difference is less than a second threshold value, dropping one or more packets received from the client network.

15. The method as recited in claim 6, further comprising:
implementing a programmatic interface defining bandwidth-dependent pricing-related operations available to the client.

16. The method as recited in claim 6, wherein the bandwidth configuration settings comprise a maximum pricing level for traffic transmission acceptable to the client, and wherein the threshold value is dependent at least in part on the maximum pricing level.

17. A non-transitory computer-accessible storage medium storing program instructions that, when executed on one or more processors, cause the one or more processors to:
receive bandwidth configuration settings associated with a client, comprising a baseline transmission rate of traffic over a network path between a client network of the client and a resource collection;
determine whether a difference between a measured transmission rate of traffic over at least a portion of the network path and a peak transmission capacity of the network path exceeds a threshold value; and
in response to determining that the difference exceeds the threshold value, initiate a transmission of a signal to the client network indicative of an available transmission rate that differs from the baseline transmission rate.

18. The non-transitory computer-accessible storage medium as recited in claim 17, wherein the signal comprises a message formatted in accordance with a routing protocol.

19. The non-transitory computer-accessible storage medium as recited in claim 18, wherein the routing protocol comprises the Border Gateway Protocol (BGP).

20. The non-transitory computer-accessible storage medium as recited in claim 17, wherein the signal comprises an advertisement of a routing prefix.

21. The non-transitory computer-accessible storage medium as recited in claim 17, wherein the program instructions, when executed on the one or more processors, cause the one or more processors to:
in response to determining that the difference is less than a second threshold value, provide an indication to the client network of a reduction in available bandwidth.

22. The non-transitory computer-accessible storage medium as recited in claim 17, wherein the bandwidth configuration settings comprise a maximum pricing level for traffic transmission acceptable to the client, and wherein the threshold value is dependent at least in part on the maximum pricing level.

\* \* \* \* \*